US009815712B2

(12) United States Patent
Diallo et al.

(10) Patent No.: US 9,815,712 B2
(45) Date of Patent: Nov. 14, 2017

(54) HIGH CAPACITY PERCHLORATE-SELECTIVE RESINS FROM HYPERBRANCHED MACROMOLECULES

(71) Applicants: Mamadou S. Diallo, Pasadena, CA (US); Changjun Yu, Pasadena, CA (US); Dennis P. Chen, Bloomington, IN (US)

(72) Inventors: Mamadou S. Diallo, Pasadena, CA (US); Changjun Yu, Pasadena, CA (US); Dennis P. Chen, Bloomington, IN (US)

(73) Assignees: California Institute of Technology, Pasadena, CA (US); AquaNano LLC, Monrovia, CA (US)

( * ) Notice: Subject to any disclaimer, the term of this patent is extended or adjusted under 35 U.S.C. 154(b) by 327 days.

(21) Appl. No.: 13/899,564

(22) Filed: May 21, 2013

(65) Prior Publication Data

US 2014/0158630 A1    Jun. 12, 2014

Related U.S. Application Data

(60) Continuation-in-part of application No. 13/734,917, filed on Jan. 4, 2013, which is a continuation-in-part
(Continued)

(51) Int. Cl.
| | |
|---|---|
| *C02F 1/42* | (2006.01) |
| *C08G 83/00* | (2006.01) |
| *C08G 73/02* | (2006.01) |
| *C08G 69/10* | (2006.01) |
| *C08L 101/00* | (2006.01) |
| *B01J 41/14* | (2006.01) |
| *B01J 41/05* | (2017.01) |

(Continued)

(52) U.S. Cl.
CPC ............... *C02F 1/42* (2013.01); *B01J 41/05* (2017.01); *B01J 41/14* (2013.01); *C08G 69/10* (2013.01);
(Continued)

(58) Field of Classification Search
None
See application file for complete search history.

(56) References Cited

U.S. PATENT DOCUMENTS

| | | | |
|---|---|---|---|
| 3,152,188 A | 10/1964 | Kirlpatrick et al. | |
| 3,784,489 A * | 1/1974 | Dales et al. | 521/30 |

(Continued)

FOREIGN PATENT DOCUMENTS

| | | |
|---|---|---|
| GB | 2338958 | 1/2000 |
| JP | 2009233594 A | 10/2009 |

(Continued)

OTHER PUBLICATIONS

Golden (Ion Exchange Resins: Characterization of; Academic Press, 2000, pp. 3172-3179).*

(Continued)

*Primary Examiner* — Rachel Kahn
(74) *Attorney, Agent, or Firm* — Nixon Peabody LLP

(57) ABSTRACT

A resin is provided for selectively binding to perchloride and related anions (e.g., $TcO_4^-$, $ReO_4^-$ and $I^-$) in aqueous solution. The resin may take the form of microparticles or beads. The beads are prepared by cross-linking macromolecules such as hyperbranched PEI, and quaternizing the amines with hydrocarbon substituents.

10 Claims, 24 Drawing Sheets

Related U.S. Application Data of application No. 13/633,088, filed on Oct. 1, 2012, which is a division of application No. 12/573,708, filed on Oct. 5, 2009, now Pat. No. 8,277,664.

(60) Provisional application No. 61/102,792, filed on Oct. 3, 2008, provisional application No. 61/583,530, filed on Jan. 5, 2012, provisional application No. 61/603,057, filed on Feb. 24, 2012, provisional application No. 61/649,881, filed on May 21, 2012.

(51) Int. Cl.
| | | |
|---|---|---|
| C02F 1/28 | (2006.01) | |
| C02F 101/10 | (2006.01) | |
| C02F 103/04 | (2006.01) | |
| C02F 103/08 | (2006.01) | |

(52) U.S. Cl.
CPC ....... *C08G 73/022* (2013.01); *C08G 73/0206* (2013.01); *C08G 73/028* (2013.01); *C08G 73/0226* (2013.01); *C08G 83/006* (2013.01); *C08L 101/005* (2013.01); *C02F 1/285* (2013.01); *C02F 2101/103* (2013.01); *C02F 2101/108* (2013.01); *C02F 2103/04* (2013.01); *C02F 2103/08* (2013.01)

(56) References Cited

U.S. PATENT DOCUMENTS

| | | | |
|---|---|---|---|
| 3,803,237 | A | 4/1974 | Lednicer et al. |
| 4,029,733 | A | 6/1977 | Faugeras et al. |
| 4,599,400 | A | 7/1986 | Tomalia et al. |
| 5,041,516 | A | 8/1991 | Frechet et al. |
| 5,419,880 | A | 5/1995 | Swider et al. |
| 5,667,694 | A | 9/1997 | Cody et al. |
| 5,928,517 | A | 7/1999 | Smith et al. |
| 6,464,971 | B1 | 10/2002 | Matthews et al. |
| 7,101,937 | B1 | 9/2006 | Frechet et al. |
| 7,342,083 | B2 | 3/2008 | Chang et al. |
| 7,470,369 | B2 | 12/2008 | Diallo |
| 8,277,664 | B2 | 10/2012 | Frechet et al. |
| 2004/0048754 | A1 | 3/2004 | Herrmann et al. |
| 2005/0040109 | A1 | 2/2005 | Smith et al. |
| 2005/0043493 | A1 | 2/2005 | Smith et al. |
| 2006/0021938 | A1* | 2/2006 | Diallo ................ 210/638 |
| 2006/0205920 | A1 | 9/2006 | Dozol et al. |
| 2006/0289359 | A1 | 12/2006 | Manek et al. |
| 2008/0206183 | A1 | 8/2008 | Commeyras et al. |
| 2009/0001802 | A1 | 1/2009 | Diallo et al. |
| 2010/0181257 | A1 | 7/2010 | Frechet et al. |
| 2013/0118986 | A1 | 5/2013 | Diallo et al. |
| 2013/0270190 | A1 | 10/2013 | Frechet et al. |
| 2014/0158630 | A1 | 6/2014 | Diallo et al. |

FOREIGN PATENT DOCUMENTS

| | | |
|---|---|---|
| KR | 10-2008-0025157 | 3/2008 |
| WO | 0053649 | 9/2000 |
| WO | 2004076509 | 9/2004 |
| WO | 2006114528 | 11/2006 |
| WO | 2006114738 | 11/2006 |
| WO | 2010/040117 | 4/2010 |

OTHER PUBLICATIONS

Gu et al (Recent advances in ion exchange for perchlorate, treatment, recovery and destruction. In Perchlorate Environmental Occurrence, Interactions and Treatment. Gu, B.,Coates, J. D., Eds.; Springer: New York, 2006, pp. 209-251).*

Michaud (The Role of Crosslinking in Ion Exchange Resins, Water Conditioning and Purification, Jun. 2011, vol. 53, No. 6, pp. 30-35).*

Vogel's Textbook of Quantitative Inorganic Analysis 5th Edition, Longman Scientific & Techinal, 1987.

Wu et al., "Efficiency and fidelity in a click-chemistry route to triazole dendrimers by the copper(I)-catalyzed ligation of azides and alkynes", Angew Chem. Int. Ed 43:3928-3932 (2004).

Xiao et al., "Ion exchange extraction of boron from aqueous fluids by Amberlite IRA 743 resin", Chin. J. Chem, 21:1073-1079 (2003).

Xu et al., "Technologies for boron removal", Ind. Eng. Chem. Res. 47(1): 16-24 (2008).

Yoshida et al., "Efficient divergent synthesis of dendronized polymners with extremely high molecular weight: Structural characterization by SEC-MALLS and SFM and novel organic gelation behavior", Macromolecules 38:334-344 (2005).

Zhou et al., "Membrane and Other Treatment Technologies—Pros and Cons", Perchlorate Environmental Occurrence, Interactions and Treatment, Chapter 17, pp. 389-404 (2006).

Chen, Y. et al., "Supramolecular Thermotropic Liquid Crystalline Materials with Nematic Mesophase Based on Methylated Hyperbranched Polyethylenimine and Mesogenic Carboxylic Acid," Macromolecular Rapid Communications, vol. 27, 2006, pp. 69-75.

Pastor-Perez, L. et al., "Unprecedented Blue Intrinsic Photoluminescence from Hyperbranched and Linear Polyethylenimines: Polymer Architectures and pH-Effects," Macromolecular Rapid Communications, vol. 28, 2007, pp. 1404-1409.

Arkas, M. et al., "Organic/Inorganic Hybrid Filters Based on Dendritic and Cyclodextrin "Nanosponges" for the Removal of Organic Pollutants from Water," Environmental Science & Technology, vol. 40, No. 8, 2006, pp. 2771-2777.

Hawker, C. J. et al., "One-Step Synthesis of Hyperbranched Dendritic Polyesters," J. Am. Chem. Soc., vol. 113, No. 12, 1991, pp. 4583-4588.

Moyer, B. A. et al., "Physical Factors in Anion Separations," Chapter 1 in Supramolecular Chemistry of Anions, edited by Bianchi, A. et al., Wiley-VCH, 1997, pp. 1-44.

Kee, R. A. et al., "Semi-Controlled Dendritic Structure Synthesis," Chapter 9 in Dendrimers and Other Dendritic Polymers, edited by J. M. J. Fréchet et al., John Wiley & Sons Ltd, 2001, pp. 209-236.

Krämer, M. et al., "pH-Responsive Molecular Nanocarriers Based on Dendritic Core-Shell Architectures," Angew. Chem. Int. Ed., vol. 41, No. 22, 2002, pp. 4252-4256.

Chi, Y. et al., "Practical Synthesis of Enantiomerically Pure B2-Amino Acids via Proline-Catalyzed Diastereoselective Aminomethylation of Aldehydes," J. Am. Chem. Soc., vol. 129, 2007, pp. 6050-6055.

Roovers, J. et al., "Dendrimers and Dendrimer-Polymer Hybrids," Advances in Polymer Science, vol. 142, 1999, pp. 179-228.

Martinez, V. et al., "Dendritic Core-Shell Macromolecules Soluble in Supercritical Carbon Dioxide," Macromolecules, vol. 39, 2006, pp. 3978-3979.

Stevelmans, S. et al., "Synthesis, Characterization, and Guest-Host Properties of Inverted Unimolecular Dendritic Micelles," J. Am. Chem. Soc., vol. 118, 1996, pp. 7398-7399.

Baek, K. Y. et al., "Core-Functionalized Star Polymers by Transition Metal-Catalyzed Living Radical Polymerization. 1. Synthesis and Characterization of Star Polymers with PMMA Arms and Amide Cores," Macromolecules, vol. 34, 2001, pp. 7629-7635.

Yam, C. M. et al., "Preparation, Characterization, Resistance to Protein Adsorption, and Specific Avidin-Biotin Binding of Poly(amidoamine) Dendrimers Functionalized with Oligo(ethylene glycol) on Gold," Journal of Colloid and Interface Science, vol. 296, 2006, pp. 118-130.

Vogtle, F. et al., "Functional Dendrimers," Prog. Polym. Sci., vol. 25, 2000, pp. 987-1041.

Yang, H. et al., "Polyethylene Glycol-Polyamidoamine Dendritic Micelle as Solubility Enhancer and the Effect of the Length of Polyethylene Glycol Arms on the Solubility of Pyrene in Water," Journal of Colloid and Interface Science, vol. 273, 2004, pp. 148-154.

International Search Report and Written Opinion in International Application No. PCT/US2008/06578, dated Feb. 4, 2009.

(56) References Cited

OTHER PUBLICATIONS

International Search Report and Written Opinion in International Application No. PCT/US2009/059464, dated May 4, 2010.
Office Action in U.S. Appl. No. 12/124,952, dated Apr. 1, 2011.
Office Action in U.S. Appl. No. 12/124,952, dated Nov. 2, 2010.
Office Action in U.S. Appl. No. 12/124,952, dated Sep. 13, 2010.
Woods W.G., "An introduction to boron: history, sources, uses and chemistry" Environ. Health Perspect., 1994, 102 (Suppl. 7): 5-11.
Restriction Requirement in U.S. Appl. No. 13/899,564, dated May 12, 2015.
Office Action in U.S. Appl. No. 12/573,708, dated Dec. 21, 2011. (restriction).
Office Action in U.S. Appl. No. 12/573,708, dated Mar. 13, 2012. (restriction).
Notice of Allowance in U.S. Appl. No. 12/573,708, dated May 30, 2012.
Office Action in U.S. Appl. No. 13/734,917, dated Apr. 15, 2015.
Restriction Requirement in U.S. Appl. No. 13/734,917, dated Oct. 30, 2014.
Chen et al., "Branched polymeric media: perchlorate-selective resins from hyperbranched polyethyleneimine", Environ. Sci. Technology 46(19):10718-10726 (2012).
Abu-Reziq et al., "Metal supported on dendronized magnetic nanoparticles: highly selective hydroformylation catalysts", J. Amer. Chem. Soc., 128:5279-5282 (2006).
Alami et al., "Influence of the preparation methods on the functional group distribution of chloromethylated styrene-divinylbenzene copolymers," React. Polym. 6:213-219 (1987).
Bacquet et al., "Spatial distribution of pendent vinyl groups during chloromethylation of macroporous styrene-divinylbenzene copolymers", Reactive Polymers 9:147-153 (1988).
Barth et al., "Reversible Cross-Linking of Hyperbranched Polymers: A Strategy for the Combinatorial Decoration of Multivalent Scaffolds," Agnew. Chem. Int. Ed. 44:1560-1563 (2005).
Boeseken et al., "On the composition of acid boric acid-diol compounds", J. Phys. Chem 35:1477-1489 (1931).
Bonnesen et al., "Development of bifunctional anion-exchange resins with improved selectivity and sorptive kinetics for pertechnetate: batch-equilibrium experiments," Environ. Sci. Technol. 34: 3761-3766 (2000).
Diallo et al, "Dendritic anion hosts: perchlorate binding to G5-NH2 poly(propyleneimine) dendrimer in aqueous solutions," Environmental Science and Technology 41: 6521-6527 (2007).
Esumi et al., "Adsorption of poly(amidoamine) dendrimers on alumina/water and silica/water interfaces", Langmuir, 14:4466-4470 (1998).
Gazi et al., "The rapid boron uptake by multihydroxyl functional hairy polymers", Sep. Purif. Technol. 62:484-488 (2008).
Gloe et al., "Where is the anion extraction going?", Chem. Eng. Technol. 26:1107-1117 (2003).
Grinstead, R.B., "Removal of boron and calcium from magnesium chloride brines by solvent-extraction", See Ind. Eng. Chem. Prod. Res. Dev., 11:454-460 (1972).
Gruttner et al., "Dendrimer-coated magnetic particles for radionuclide separation", Journal of Magnetism and Magnetic Materials 293 (2005) 559-566.
Tripp et al., "Ion exchange for the remediation of perchlorate-contaminated drinking water", J. American Water Works Association. 98(4):105-114 (2006).
Gu et al., "Treatment of perchlorate-contaminated groundwater using highly selective, regenerable ion-exchange technologies," Environ. Sci. Technol. 41:6277-6282 (2007).
Hogue et al., "Rocket-Fueled River," Chem. & Eng. News 8,1(33):37-46 (2003).
Hou et al., "A review on speciation of iodine-129 in the environmental and biological samples," Anal. Chim. Acta. 632: 181-196 (2009).
Icenhower et al., "The biogeochemistry of technetium: a review of the behavior of an artificial element in the natural environment," American Journal of Science 310: 721-752 (2010).

Kaftan et al., "Synthesis, characterization and application of a novel sorbent, glucamine-modified MCM-41, for the removal/preconcentration of boron from waters,", Anal. Chim. Acta, 547:31-41 (2005).
Lehman et al., "Perchlorate and nitrate treatment by ion exchange integrated with biological brine treatment," Water. Res. 42: 969-976 (2008).
Matejka et al., "Selective Uptake and Separation of Oxoanions of Molybdenum, Vanadium, Tungsten, and Germanium by Synthetic Sorbents Having Polyol Moieties and Polysaccharide-Based Biosorbents," in Fundamentals and Applications of Anion Separations, Moyer & Singh, eds., Kluwer Academic/Plenum Publishers, New York, 2004.
Miwa et al., "Plant Tolerant of High Boron Levels", Science, 318:1417 (2007).
Mosier-Boss, P.A., "Recent developments in perchlorate detection," in Perchlorate Environmental Occurrence, Interactions and Treatment; Gu, B. & Coates, J. D., eds., Springer: New York. (2006).
Mudd, G.M., "Critical review of acid in situ leach uranium mining: 1. USA and Australia", Enviromental Geology 41:390-403 (2001).
Navratil et al., "Actinide ion exchange technology in the back end of the nuclear fuel cycle", Nukleonika 46(2):75-80 (2001).
Office Action in U.S. Appl. No. 13/633,088, dated Oct. 10, 2014.
Office Action in U.S. Appl. No. 13/633,088, dated Dec. 29, 2014.
Office Action in U.S. Appl. No. 13/633,088, dated Aug. 14, 2015.
Office Action in U.S. Appl. No. 13/899,564, dated Aug. 21, 2015.
Ocken, H., An Evaluation Report of Enriched Boric Acid in European PWRs; EPRI Report 1003124; Electric Power Research Institute, 2001.
Ottaviani et al., "A Term and EPR investigation of the competitive binding of Uranyl ions to starburst dendrimers and liposomes potential use of dendrimers as uranyl ion sponges", Langmuir 16:7368-7372 (2000).
Ottaviani et al., "EPR investigation of the adsorption of dendrimers on porous surfaces", J. Phys. Chem. B 107:2046-2053 (2003).
Paiva et al., "Recent advances on the chemistry of solvent extraction applied tot he reprocessing of spent nuclear fuels and radioactive wastes", J. Rad. Nucl. Chem. 261(2):485-496 (2004).
Rademann et al., "ULTRA Loaded Resins Based on the Cross-Linking of Linear Poly(ethylene imine). Improving the Atom Economy of Polymer-Supported Chemistry", Angnew Chem. International Edition 41(16):2975-2978 (2002).
Rivas et al., "Branched and linear polyethyleneimine supports for resins with retention properties for copper and uranium,", J. Applied Polymer Science 38:801-07 (1989).
Rivas et al., "Synthesis and metal complexation of poly9ethyleneimine) and derivatives", Polymer Synthesis Oxidation Processes, vol. 102 Advances in Polymer Science, Springer Berlin: Heidelberg, pp. 171-188 (1992).
Roice et al., "ULTRAMINE: A High-Capacity Polyethylene-Imine-Based Polymer and Its Application as a Scavenger Resin," Chemistry—A European Journal 10: 4407-4415 (2004).
Scholl et al., "Controlling polymer architecture in the thermal hyperbranched polymerization of 1-lysine," Macromolecules 40: 5726-5734 2007).
Shannon et al., "Science and technology for water purification in the coming decades,", Nature, 2008, 452: 301-310 (2008).
Shepherd et al., "Studies of Cross-linked Poly(ethyleneimine) Ion-Exchange Resin", J. Chem. Soc., 86-92 (1957).
Sherrington, D.C., "Preparation, structure and morphology of polymer supports," Chem. Commun., pp. 2275-2286 (1998).
Simonnot et al., "Boron removal from drinking water with a boron selective resin: Is the treatment really selective?", Wat. Res., 2001, 34(1):109-116 (2000).
Smith et al., "Boric acid recovery using polymer filtration: studie.s with alkyl monool, diol, and triol containing polyethylenimines", Journal of Applied Polymer Science 97:1590-1604 (2005).
Szabo et al., "Solution coordination chemistry of actinides: thermodynamics, structure and reaction mechanism", Coordination Chemistry Reviews 250:784-815 (2006).
Cotton, S., Lanthanide and Actinide Chemistry. John Wiley & Sons, New York, Feb. 2006.

(56) References Cited

OTHER PUBLICATIONS

Davis et al., "Consideration of Geochemical Issues in Groundwater Restoration at Uranium In-Situ Leach Mining Facilities". NUREG/CR-6870, US Nuclear Regulatory Commision, Office of Nuclear Regulatory Research, Washington, DC 20555-0001, Jan. 2007.
Gu et al., "Selective anion exchange resins for the removal of perchlorate (ClO4) from groundwater," Oak Ridge National Laboratory Report ORNL/TM-13753, Feb. 1999.
Pontius et al., "Regulating perchlorate in drinking water," in Perchlorate in the Environment, Urbansky, T.E. ed., Kluver Academic: New York, 2000.
Tomalia et al., Dendrimers—an Enabling Synthetic Science to Controlled Organic Nanostructures, Chapter 24, Handbook of Nanoscience, Engineering and Technology, 2nd Edition, CRC Press:Boca Raton, FL, May 3, 2007.
Mishra, Himanshu et al., "Branched Polymeric Media: Boron-Chelating Resins from Hyperbranched Polyethylenimine", Environ. Sci. Technol., 2012, 46 (16), pp. 8998-9004.
Office Action in U.S. Appl. No. 13/734,917, dated Aug. 21, 2015.
Office Action in U.S. Appl. No. 13/734,917, dated Dec. 23, 2015.
Office Action in U.S. Appl. No. 13/734,917, dated Aug. 15, 2016.

\* cited by examiner

R = isobutyl or H
R' = propyl or H

HIGH CAPACITY PERCHLORATE-SELECTIVE RESINS FROM HYPERBRANCHED MACROMOLECULES

CROSS-REFERENCE TO RELATED APPLICATIONS

This application is a continuation-in-part of co-pending U.S. patent application Ser. No. 13/734,917 entitled "High Capacity Oxoanion Chelating Media from Hyperbranched Macromolecules," filed Jan. 4, 2013, in the name of inventors Mamadou DIALLO, Changjun YU, and Himanshu MISHRA, which is a continuation-in-part of U.S. patent application Ser. No. 13/633,088 entitled "Extraction of Anions from Solutions and Mixtures using Hyperbranched Macromolecules," filed Oct. 1, 2012, in the name of inventors Jean FRECHET, Emine BOZ, Mamadou DIALLO, and Yonggui CHI, which is a divisional of U.S. patent application Ser. No. 12/573,708, now U.S. Pat. No. 8,277,664 (issued Oct. 2, 2012), entitled "Extraction of Anions from Solutions and Mixtures using Hyperbranched Macromolecules," filed Oct. 5, 2009, in the name of inventors Jean FRECHET, Emine BOZ, Mamadou DIALLO, and Yonggui CHI, which claims priority to U.S. Provisional Patent Application Ser. No. 61/102,792, entitled "Extraction of Anions from Solutions and Mixtures using Hyperbranched Macromolecules," filed Oct. 3, 2008, in the name of inventors Emine BOZ, Jean FRECHET, Mamadou DIALLO, and Yonggui CHI. The Ser. No. 13/734,917 application also claims the benefit of priority of U.S. Provisional Patent Application Ser. No. 61/583,530, entitled "High Capacity Perchlorate-Selective Media from Hyperbranched Macromolecules," filed Jan. 5, 2012, in the name of inventors Mamadou DIALLO, Changjun YU, and Himanshu MISHRA. The Ser. No. 13/734,917 application further claims the benefit of priority of U.S. Provisional Application Ser. No. 61/603,057, entitled "High Capacity Perchlorate-Selective Media from Hyperbranched Macromolecules," filed Feb. 24, 2012 in the name of inventors Mamadou DIALLO, Changjun YU, and Himanshu MISHRA. The present application also claims the benefit of priority of U.S. Provisional Application Ser. No. 61/649,881, entitled "High Capacity and Perchlorate-Selective Resins from Hyperbranched Macromolecules," filed May 21, 2012 in the name of inventors Mamadou DIALLO, Changjun YU, and Dennis P. Chen. The entire disclosures of each of the above-identified applications are hereby incorporated by reference as if set forth fully herein.

GOVERNMENT RIGHTS

This invention was made with government support under CBET0506951 awarded by the National Science Foundation. The government has certain rights in the invention.

TECHNICAL FIELD

This subject matter relates generally to the functionalization of porous microspheres with anion-specific hyperbranched polymer structures.

BACKGROUND

Perchlorate ($ClO_4^-$) is a water-soluble anion that has been widely used in the manufacturing of explosives, mines and solid propellants for pyrotechnic devices, rockets and missiles. See Hogue, C. (2003), "Rocket-Fueled River," *Chem. & Eng. News* 81: 37-46. It has emerged as a groundwater and surface water contaminant in various locations since the development of a sensitive ion chromatography assay that can detect low levels of perchlorate in water, on the order of 2 parts per billion (ppb)). See Hogue; Pontius, F. W., Damian, P., & Eaton, A. D. (2000), "Regulating perchlorate in drinking water," in *Perchlorate in the Environment*, Urbansky, T. E. ed., Kluver Academic: New York; Mosier-Boss, P. A. (2006), "Recent developments in perchlorate detection," in *Perchlorate Environmental Occurrence, Interactions and Treatment*; Gu, B. & Coates, J. D., eds., Springer: New York. When ingested at high concentrations, perchlorate can inhibit the uptake of iodide by the thyroid gland and may disrupt its ability to produce hormones critical to developing fetuses and infants.

Reverse osmosis, nanofiltration, and electrodialysis are not cost effective at treating drinking water sources contaminated by low-concentrations of perchlorate (lower than about 100 ppb). See Zhou, P., Brown, G. M. & Gu, B (2006), "Membranes and other treatment technologies-pros and cons," *Perchlorate Environmental Occurrence, Interactions and Treatment*, Gu, B. & Coates, J. D. eds., Springer: New York. Ion exchange (IX) with selective and disposable resins has been considered to be the best available technology for treating drinking groundwater sources with perchlorate concentration less than about 100 ppb. See Tripp, A. R. & Clifford. D. A. (2006), "Ion exchange for the remediation of perchlorate-contaminated drinking water," *J. American Water Works Association.* 98: 105-114; Lehman, S. G. et al. (2008), "Perchlorate and nitrate treatment by ion exchange integrated with biological brine treatment," *Water. Res.* 42: 969-976. Conventionally, most commercial anion exchange resins have been prepared by functionalization of crosslinked styrene DVB beads using a two-step process. See Helfferich, F. (1962), *Ion Exchange*, McGraw-Hill Series in Advanced Chemistry: New York; Harland, C. E. (1994), *Ion Exchange: Theory and Practice*, The Royal Society of Chemistry: Cambridge.; Sherrington, D. C. (1998), "Preparation, structure and morphology of polymer supports," *Chem. Commun.*, pp. 2275-2286. In the first step, chloromethyl groups are attached to the resins via a Friedel-Crafts reaction of the resin aromatic rings with an alkyl halide (e.g. chloromethyl methyl ether) using a Lewis acid catalyst (e.g. aluminum chloride). In the second step, the chloromethyl groups are reacted successively with a trihexyl amine and a triethyl amine to afford a perchlorate-selective resin such as the PUROLITE A-530E with trihexyl/triethyl quaternary ammonium groups. See Gu, B. H., Brown, G. M. & Chiang, C. C. (2007), "Treatment of perchlorate-contaminated groundwater using highly selective, regenerable ion-exchange technologies," *Environ. Sci. Technol.* 41: 6277-6282. The amination of chloromethylated crosslinked polystyrene is a facile reaction with very high yield in most cases. However, a number of side reactions occur during the Friedel-Crafts chlomethylation reaction including the secondary crosslinking of approximately 50% of the aromatic rings via "methylene bridging." See Alami, S. W., Le Maguer, D. & Caze, C. (1987), "Influence of the preparation methods on the functional group distribution of chloromethylated styrene-divinylbenzene copolymers," *React. Polym.* 6: 213-219; Bacquet, M. et al. (1988), "Spatial distribution of pendent vinyl groups during chloromethylation of macroporous styrene-divinylbenzene copolymers," *React. Polym.* 9: 147-153. This greatly reduces the number of chloromethyl groups available for amination. As a result of this, the exchange capacities of styrene-DVB perchlorate-selective resins with trihexyl/triethyl quaternary ammonium groups (i.e. PUROLITE A-530E) are limited to a maximum strong-base exchange capacity (SBEC) of 0.6 eq/L (Cl$^-$). Thus, the overall treatment cost of drinking groundwater sources contaminated by perchlorate becomes prohibitive when using disposable commercial perchlorate-selective resins due to the low SBEC of these resins.

Prior attempts have been made to synthesize anion exchange resins using poly(ethyleneimine)s (PEI) as precursors. However, none of these previous studies has yielded anion exchange resins with SBEC exceeding those of commercial styrene-divinylbenzene (St-DVB) resins. See Helfferich (1962); Rivas, B. et al. (1989), "Branched and linear polyethyleneimine supports for resins with retention properties for copper and uranium," *J. Applied Polymer Science* 38:801-07; Rivas, B. & Geckeler, K. (1992) in *Polymer Synthesis Oxidation Processes*, vol. 102 *Advances in Polymer Science*, Springer Berlin: Heidelberg, pp 171-88; Shepherd, E. J. & Kitchner, J. A. (1957), "Studies of Cross-linked Poly(ethyleneimine) Ion-Exchange Resin," J. Chem. Soc., 86-92; Rademann, J. & Barth, M. (2002), "ULTRA Loaded Resins Based on the Cross-Linking of Linear Poly(ethylene imine). Improving the Atom Economy of Polymer-Supported Chemistry," *Angewandte Chemie International Edition* 41: 3313-3313; Barth, M., Fischer, R., Brock, R. & Rademann, J. (2005), "Reversible Cross-Linking of Hyperbranched Polymers: A Strategy for the Combinatorial Decoration of Multivalent Scaffolds," *Angewandte Chemie International Edition* 44: 1560-63; Roice, M., Christensen, S. F. & Meldal, M. (2004), "ULTRAMINE: A High-Capacity Polyethylene-Imine-Based Polymer and Its Application as a Scavenger Resin," *Chemistry—A European Journal* 10: 4407-15; Chang, H. T., Charmot, D. & Zard, S. P., *Polyamine Polymers*, U.S. Pat. No. 7,342,083 B2 (issued Mar. 11, 2008).

Thus, there is a great need for more efficient and cost effective processes and media for recovering perchlorate from aqueous solutions.

SUMMARY

The present disclosure relates to new categories of resins that can selectively extract perchlorate from aqueous solutions. Various embodiments are possible, which are exemplified here. These examples in no way limit or otherwise affect the scope or meaning of the claims, and are presented as illustrations only.

In one embodiment, a perchlorate-selective microparticle is described, which comprises a branched macromolecular structure (A) comprising a plurality of branches, a plurality of terminal functional groups, and a plurality of cross-linking moieties within the same molecular structure; wherein each of a plurality of said plurality of branches comprises an N,N,N-substituted (quaternary) n-aminoalkyl moiety comprising three substituent moieties, and wherein said plurality of branches optionally comprises one or more N,N-substituted (tertiary) n-aminoalkyl moieties comprising two substituent moieties. Each of these substituent moieties comprises one of the following: (a) another of said plurality of branches; (b) one of the plurality of terminal functional groups; or (c) one of the cross-linking moieties attached at a first cross-linking end. The cross-linking moiety further comprises a second cross-linking end, by which the moiety is also one of said substituent moieties of one of said plurality of branches at a different location within the branched macromolecular structure A. The structure A has a molecular weight of at least 1500 grams per mole, and in one embodiment comprises essentially no primary or secondary amine moieties. Finally, each of the plurality of terminal functional groups comprises a hydrocarbon moiety.

In another embodiment, the above microparticle may be used in a method for filtering anions from an aqueous solution. This method comprises: providing a solution containing a first quantity of an anion selected from the group consisting of $ClO_4^-$, $TcO_4^-$, $ReO_4^-$ and $I^-$; providing a stationary bed comprising the above microparticles, having voids between said microparticles to allow the passage of the aqueous solution; passing the aqueous solution through the stationary bed; and recovering the solution after it passes through the stationary bed.

In another embodiment, there is described a method for preparing a perchlorate-selective microparticle comprising: (a) providing a branched molecule with a molecular weight of at least 1500 grams per mole, comprising a plurality of branches including a plurality of tertiary amine moieties, a plurality of primary amine moieties, and optionally one or more secondary amine moieties; reacting the branched molecule with one or more cross-linking agents to produce a cross-linked resin matrix in the form of a microparticle comprising a plurality of primary, secondary, and/or tertiary amine moieties; quaternizing the plurality of primary, secondary, and/or tertiary amine moieties by quaternary substitution of said amine moieties with a hydrocarbon moiety; and during and/or after step (b), removing water from the microparticle so that the water content of the microparticle is less than about 50% water by weight.

BRIEF DESCRIPTION OF THE DRAWINGS

The accompanying drawings, which are incorporated into and constitute a part of this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification or the common knowledge within this field.

In the drawings.

DETAILED DESCRIPTION

Figure 1:
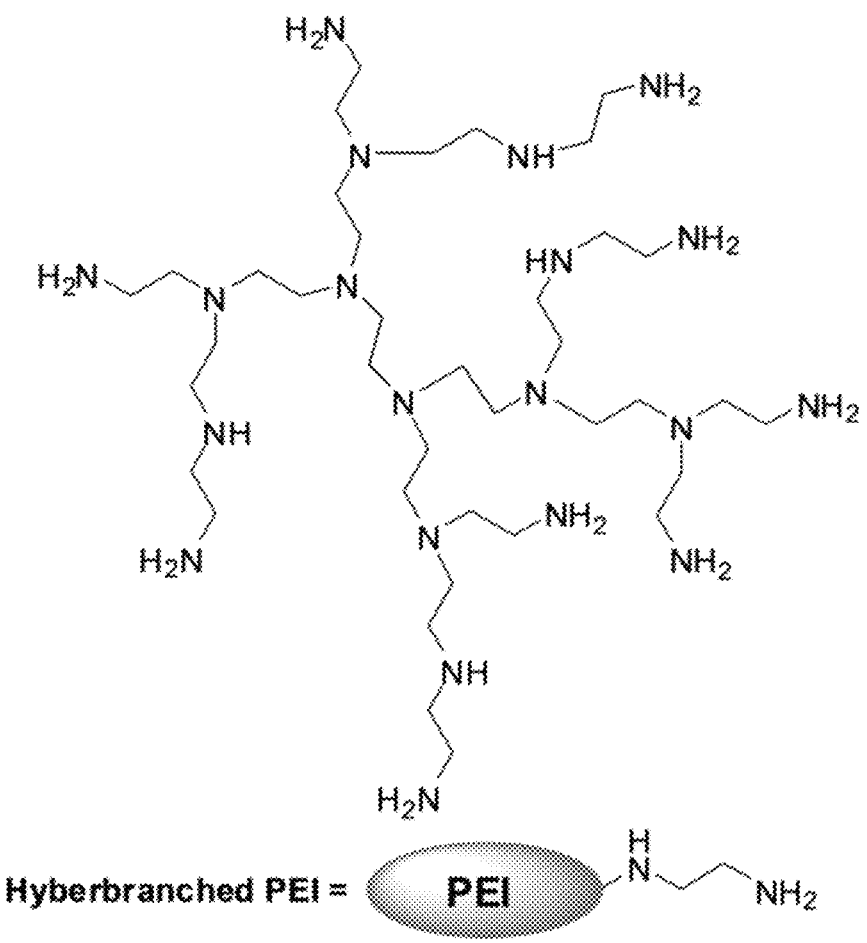
FIG. 1 is a diagram showing two equivalent chemical formulas illustrating an example of hyperbranched poly (ethyleneimine) polymers, which may in one embodiment be used as building blocks for the synthesis of perchlorate-selective media.

In this disclosure there are presented various embodiments of inventions relating to high capacity media that can selectively extract perchlorate from aqueous solutions. As described herein, extraction can in various embodiments be obtained from solutions of varying ionic strength and in the presence of competing anions (e.g. chloride, sulfate, bicarbonate and nitrate) including groundwater, surface water and industrial/municipal wastewater. Media may be created that have higher exchange capacity and selectivity than commercial resins such as the PUROLITE A-530E resin. Hyberbranched PEI macromolecules (FIG. 1) can be used as building blocks to synthesize a new generation of perchlorate-selective anion exchange resins with high capacity. Batch and column studies of perchlorate removal from a simulated groundwater indicate that our these new resins outperform commercial resins in both exchange capacity and selectivity.

Those of ordinary skill in the art will understand that the following detailed description is illustrative only and is not intended to be in any way limiting. Other embodiments of the present inventions will readily suggest themselves to such skilled persons having the benefit of this disclosure, in light of what is known in the relevant arts. Reference will now be made in detail to exemplary implementations of the present inventions as illustrated in the accompanying drawings.

In the interest of clarity, not all of the routine features of the exemplary implementations described herein are shown and described. In the development of any such actual implementation, numerous implementation-specific decisions must be made in order to achieve the specific goals of the developer, such as compliance with application and business-related constraints, and that these specific goals will vary from one implementation to another and from one developer to another. Moreover, such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, further clarifications and descriptions are provided for relevant terms and concepts as set forth below:

The term degree of branching (DB) has a meaning known in the field, and use herein is consistent with that meaning. A definition is provided, for example, in C. J. Hawker, R. Lee, and J. M. J. Fréchet, The One-Step Synthesis of Hyperbranched Dendritic Polyesters, J. Am. Chem. Soc., 1991, 113: 4583. The degree of branching may be defined by the formula:

$$DB = \frac{\sum D + \sum T}{\sum D + \sum T + \sum L}$$

where $\Sigma D$ is the sum of dendritic units, $\Sigma T$ is the sum of terminal units, and $\Sigma L$ is the sum of linear units. The terms dendritic units, terminal units, and linear units have their normal meaning as understood by those of skilled in the field. The degree of branching may be determined in several different ways, including directly through analysis of the structure, and indirectly through characterization of $^{13}C$-NMR spectra or other indirect means known in the art.

The terms hyperbranched polymer and hyperbranched as used herein refer to their definitions as known to those of skill in the art. A hyperbranched polymer comprises polydisperse dendritic macromolecules which are generally prepared in a single synthetic polymerization step that forms imperfect branches, generally in a non-deterministic way. However, there are many synthetic strategies known in the art to prepare hyperbranched polymers with lower polydispersity. They are typically characterized by their degree of branching (DB). An amine-based hyperbranched polymer may comprise tertiary, secondary, and primary amines, unless it has been modified, in which case the primary amines might as an example be converted to secondary and/or tertiary amines and secondary amines might, for example, be converted to tertiary amines, leading the same imperfect branched structure.

The terms hyperbranched polyethyleneimine (PEI) polymer, or simply polyethyleneimine, or PEI, refers to a class of hyperbranched polymers known in the art. Generally, PEI polymers typically have a degree of branching (DB) of approximately 65-70%, consisting of primary, secondary, and tertiary amines, the amines being linking by $C_2$ alkyl chains. PEI with various molecular weights (MW) ranging from about 1,000 to several million Daltons are commercially available. Among many ways known in the art for preparing hyperbranched PEI, one is through ring opening polymerization of aziridine. A diagram showing two equivalent chemical formulas illustrating an example of hyperbranched poly(ethyleneimine) polymers, which may in one embodiment be used as building blocks for the synthesis of perchlorate-selective media is illustrated in FIG. 1.

The term moiety as used herein refers to any part of an organic molecule, and may include, without limitation, a functional group, an alkyl chain, a branch of a branched molecule, or a continuation of a branched structure.

Figure 2:
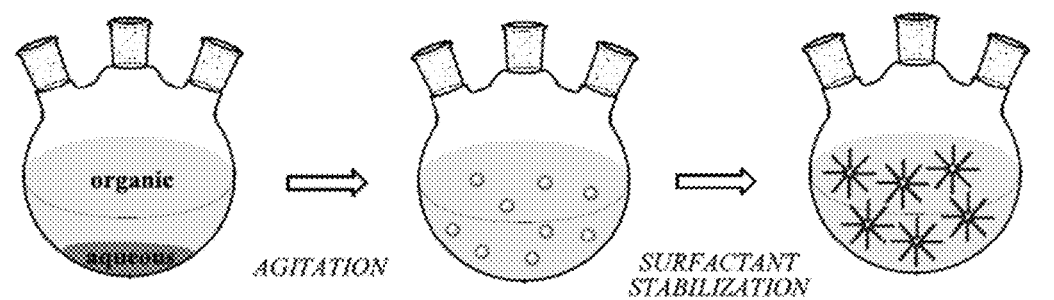
FIG. 2 is a diagram and chemical equation illustrating the preparation of base PEI beads by inverse suspension polymerization.
Figure 2:
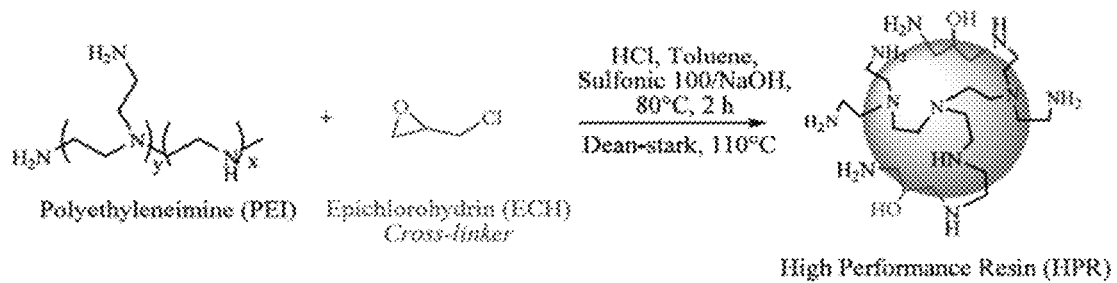

In one embodiment, a class of roughly spherical base PEI beads may be prepared in a first step. This class of beads may be created as shown in FIG. 2. This figure is a chemical equation illustrating a hyperbranched polyethyleneimine (PEI) macromolecule (in one embodiment $M_w$ is roughly 25000 Dalton). This macromolecule may be crosslinked with epichlorohydrin (ECH) to afford nearly spherical beads in inverse suspensions of toluene and water stabilized by a surfactant (for example, sodium dodecyl benzyl sulfonate (SDBS), although other surfactants are appropriate). The surfactant may in one embodiment be generated in-situ by reacting dodecyl benzyl sulfonic acid with sodium hydroxide (NaOH). Other cross-linkers may be used with equal effect. Cross-linkers may be expected to have a carbon or other organic chain, with at least two functional groups capable of binding to the primary and secondary amines of the PEI. After cross-linking, what results is a cross-linked hyperbranched class of macromolecules, referred to here as High Performance Resin (HPR).

Figure 10:
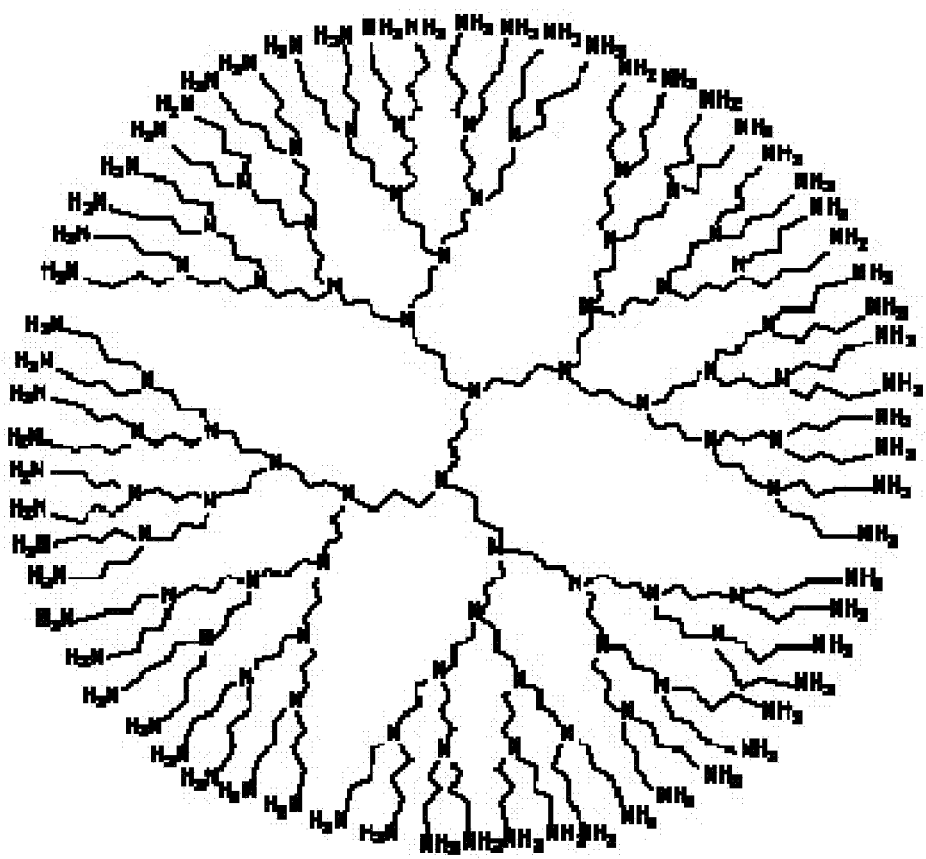
FIG. 10 is a diagram illustrating the structure of a G5-$NH_2$ poly(propyleneimine) dendrimer.
Figure 11:
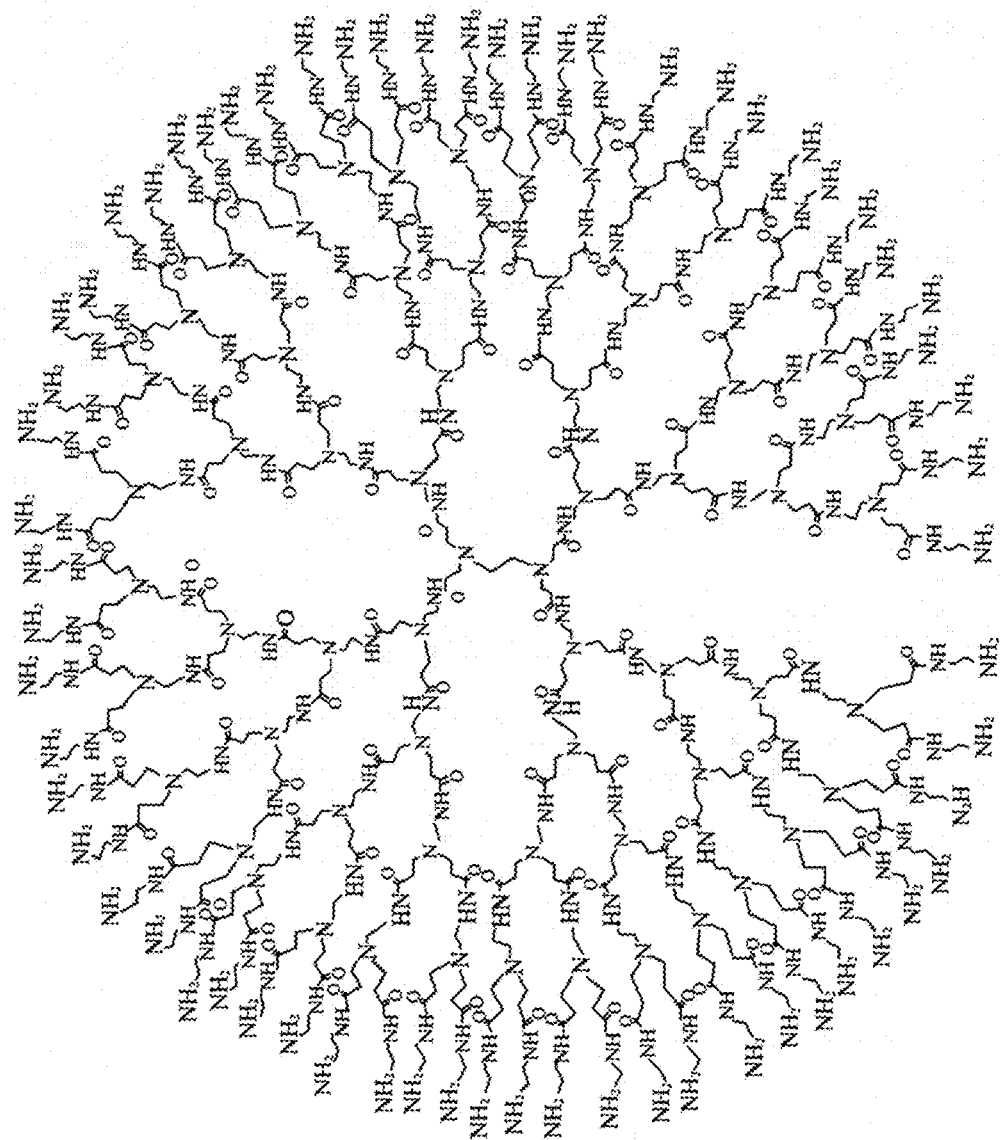
FIG. 11 is a diagram illustrating the structure of a G4-$NH_2$ poly(amidoamine) dendrimer.
Figure 12:
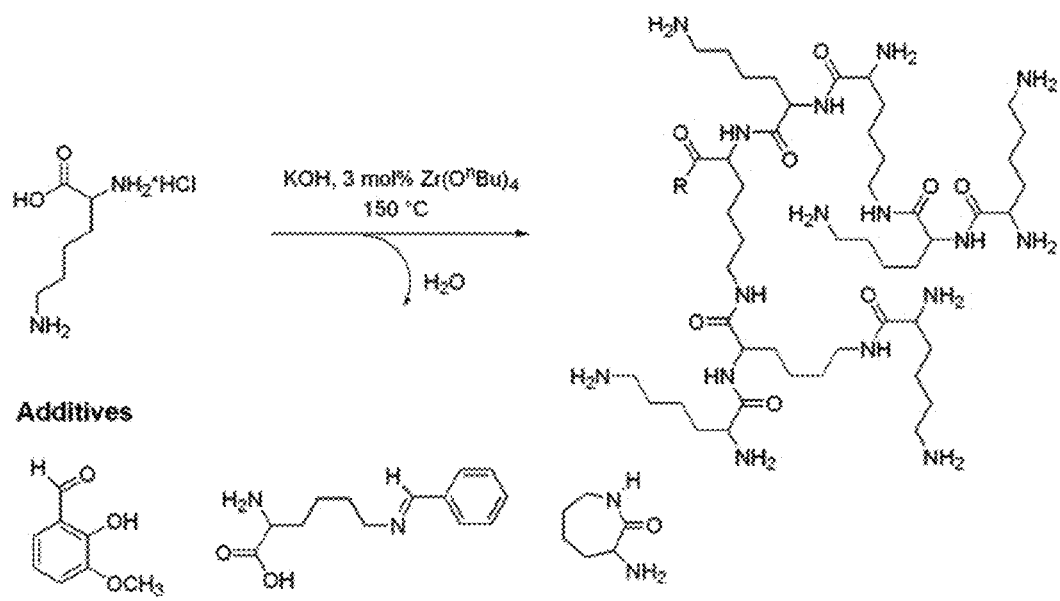
FIG. 12 is a chemical equation illustrating an example of the production of a hyperbranched lysine macromolecule.
Figure 13:
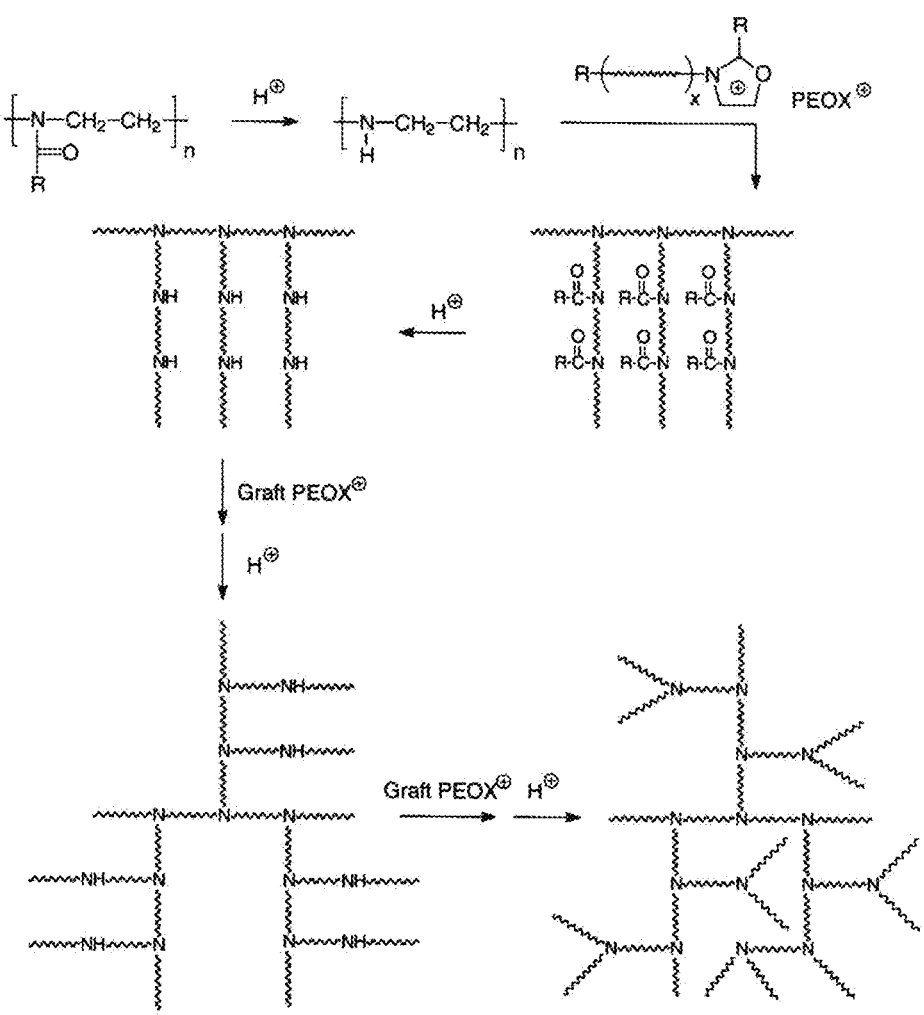
FIG. 13 is a chemical equation illustrating the synthesis of a dendrigraft macromolecule synthesized via grafting of poly(2-ethyl-2-oxazoline) (PEOX) onto linear poly(ethyleneimine).

In addition to hyperbranched PEI macromolecules (FIG. 1), the resin synthesis methodologies described in this disclosure can be applied to any water-soluble branched macromolecules with functional nitrogen (N) groups, including Gx-$NH_2$ PPI dendrimers (FIG. 10) (see Diallo, M. S. et al. (2007), "Dendritic anion hosts: perchlorate binding to G5-$NH_2$ poly(propyleneimine) dendrimer in aqueous solutions," *Environmental Science and Technology* 41: 6521-6527), Gx-$NH_2$ PAMAM dendrimers (FIG. 11) (id.), hyperbranched lysine macromolecules (FIG. 12) (Scholl, M. et al (2007), "Controlling polymer architecture in the thermal hyperbranched polymerization of 1-lysine," *Macromolecules* 40: 5726-5734), Hybrane hyperbranched polymers and scheme for dendrigraft macromolecules (FIG. 13) synthesized through the grafting of poly(2-ethyl-2-oxazoline) (PEOX) onto linear poly(ethyleneimine) (PEI) (Kee, R. A., Guathier. M. & Tomalia, D. A. (2001), "Semi-controlled dendritic structure synthesis," in *Dendrimers and Other Dendritic Polymers*, Frechet, J. M. J. & Tomalia, D. A. eds., John Wiley & Sons, Ltd., pp 209-236).

The synthesis described in FIG. 2 may in one embodiment proceed as follows: A Morton-type flask (one liter) may be used, equipped with an overhead mechanical stirrer, a thermometer, a reflux condenser, an additional funnel, and an inert gas port. To the flask may be added 63 g of water-free PEI. While the flask is cooled in a water bath, a solution of 36 g of concentrated HCl in 42 g of DI-water may be added with an occasional shaking. To this warm PEI solution may be added a mixture of 1 g of sulfonic 100 (acid form of a branched surfactant) in 4 mL of 1.1 N sodium hydroxide solution. After shaking well, 450 mL of toluene may be added and the mixture may be stirred at an oil bath with temperature set at about 70° C. or 80° C. under nitrogen. After about 30 min, a solution of 40 g of ECH (epichlorohydrin) in 70 mL of toluene may be added through an additional funnel within 45 min. The mixture may be stirred for another 30 min after completion of ECH solution and then temperature may be adjusted to 110° C. and a dehydration process using a Dean-Stark apparatus or other equivalent dehydration process may be initialed until about 30 mL of water is collected. After cooling to room temperature, top solvents may be decanted, 400 mL of methanol may be added and the resulting beads may be filtered off and washed twice with methanol. The resulting beads may be transferred into 600 mL of 3 N NaOH solution. The beads may be filtered off, washed three times with DI-water and stored at room temperature. Size and size distributions of these beads may be measured using standard equipment and procedures. The PEI beads may be directly used for the next step reaction. This procedure is for illustrative purposes, and the specifics of this procedure may be modified according to principles of chemical synthesis known in the art.

Reagent grade chemicals may be used to synthesize all the base PEI beads and perchlorate-selective PEI resins described herein. Precursor polyethylenimine macromolecules (PEI) (e.g., SP-018 (molecular weight $M_n$=1800) and SP-200 ($M_n$=10,000)) may be purchased from several commercial sources, for example, from Nippon Shokubai Co., Ltd. of Japan. Although commercial-grade PEI is used in this example, other hyperbranched molecules based on amine linkages may also be used, and the hyperbranched macromolecule can be expected to have a wide variety of possible degrees of branching. The degree of branching is expected to affect the size and efficiency of the ultimate bead.

Figure 3:
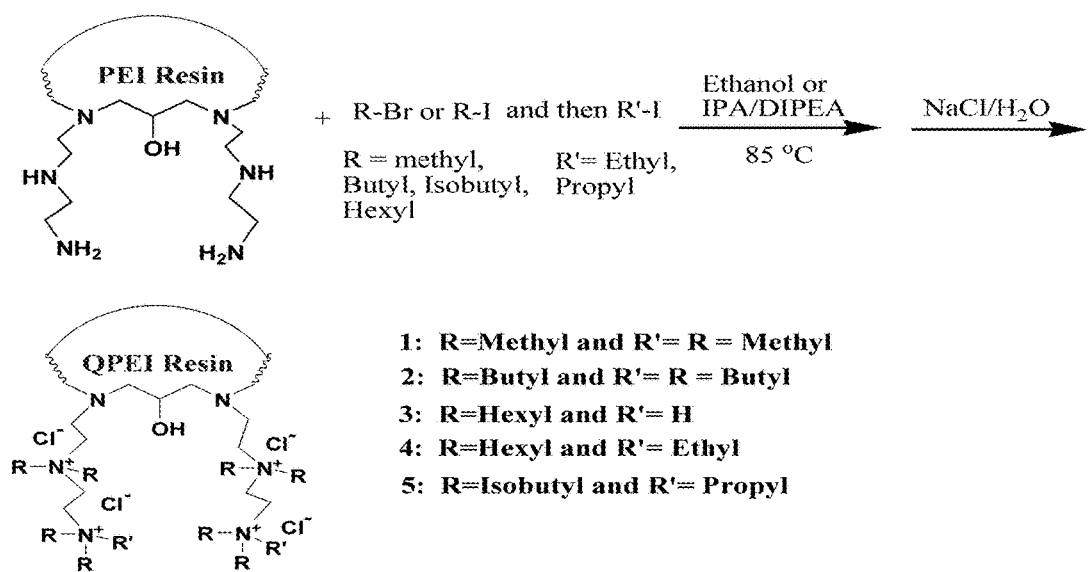
FIG. 3 is a chemical equation illustrating a reaction scheme for alkylation reactions of base PEI resins. The reactions may, for example, be carried out in ethanol or isopropanol (IPA) using diisopropylethylamine (DIPEA) as scavenger.

In a second step, the base PEI resins (HPR) may in one embodiment be alkylated via the scheme of FIG. 3 to afford the synthesis of quartemized PEI (QPEI) resins with different alkyl chains. This second step may in one embodiment involve a high temperature refluxing of the reaction mixture at 110° C. using a Dean-Stark apparatus. Because ECH contains two functional groups with different reactivity, it is expected that its more reactive epoxy groups undergo ring opening at the lower temperature of 70° C. to react with amino groups of the PEI. This may be followed by nucleophilic displacement of the chloro groups by the remaining amino groups of the PEI at the higher temperature of 110° C. In all cases, the complete dehydration of the reaction mixtures at 110° C. may be interpreted as an indicator of the completeness of crosslinking reactions.

Table 1 shows that perchlorate has a larger ionic radius and hydration free energy than most anions present in groundwater and surface water. Thus, it would be expected that QPEI resins with hydrophobic cavities will selectively bind perchlorate over more hydrophilic anions such as $Cl^-$, $NO_3^-$, $HCO_3^-$ and $SO_4^{2-}$ based on studies of perchlorate binding to a generation 5 (G5-NH$_2$) poly(propyleneimine) [PPI] dendrimer and a generation 4 (G4-NH$_2$) poly(amidoamine) [PAMAM] dendrimer in water and model electrolyte solutions (Diallo et al. 2007).

TABLE 1

Selected Properties of Perchlorate and Related Anions.

| Anion | [a]Ionic Radius (nm) | [b]Charge-to-Size Ratio | [a]Hydration Free Energy (kJ/mol) | [c]Shape |
| --- | --- | --- | --- | --- |
| $ClO_4^-$ | 0.24 | −4.2 | −259 | Tetrahedral |
| $TcO_4^-$ | 0.25 | −4 | −245 | Tetrahedral |
| $ReO_4^-$ | 0.26 | −3.8 | −240 | Tetrahedral |
| $IO_4^-$ | 0.25 | −4 | −250 | Tetrahedral |
| $I^-$ | 0.21 | −4.8 | −282 | Spherical |
| $Cl^-$ | 0.172 | −5.81 | −340 | Spherical |
| $NO_3^-$ | 0.196 | −5.10 | −300 | Trigonal Planar |
| $HCO_3^-$ | 0.156 | −6.41 | −335 | Trigonal Planar |
| $SO_4^{2-}$ | 0.230 | −8.69 | −1295 | Tetrahedral |

[a]Data compiled by Moyer, B. A. and Bonnese, P. V. (1997), "Physical factors in anion separations," in *Supramolecular Chemistry of Anions*. Bianchi, A.; Bowman-James, K. & Garcia-Espana, E., eds., Wiley-VCH, New York, pp 1-44.
[b]Equal to the ratio of the charge of the anion to its ionic radius.
[c]Geometrical arrangements of anions taken from Gloe, K.; Stephan, H. and Grotjahn, M. (2003), "Where is the anion extraction going?" *Chem. Eng. Technol.* 26: 1107-1117.

Various embodiments of the above QPEI resins may include, for example, Resins 1-3 which may be synthesized by reacting a base PEI resin with iodomethane, 1-bromobutane, and 1-bromohexane, respectively. Resin 3 may be further reacted with iodoethane to increase its extent of quaternization (Resin 4). Conversely, Resin 5 may be prepared by reacting a base PEI resin with a branched haloalkane (i.e., 1-bromo-2-methylpropane) and subsequently with 1-iodopropane. In this example, the second alkylation reactions for Resins 4 and 5 would be for the purpose of increasing the conversion of amines to quaternary ammonium groups.

In other embodiments the resins described herein may be used with anions that are related to perchlorate, including $TcO_4^-$, $ReO_4^-$ and $I^-$. While significant research efforts have been devoted to the development of selective chelating agents for cation separations, anion separations have comparatively received limited attention. See Moyer, B. A. & Bonnese, P. V. (1997), "Physical factors in anion separations," in *Supramolecular Chemistry of Anions*, Bianchi, A.; Bowman-James, K. & Garcia-Espana, E., eds., Wiley-VCH, New York, pp 1-44; Gloe, K., Stephan, H. & Grotjahn, M. (2003), "Where is the anion extraction going?" *Chem. Eng. Technol.* 26: 1107-1117.

Unlike cations, anions have filled orbitals and thus do not covalently bind to ligands in most cases. Anions have a variety of geometries (e.g., spherical for $Cl^-$ and tetrahedral for $ClO_4^-$) (Table 1). The charge-to-radius ratios of anions are also lower than those of cations. Because of this, anion binding to ligands through electrostatic interactions tends to be weaker. In addition to electrostatic interactions, anion binding capacity and selectivity also depend on (i) anion hydrophobicity, (ii) solution pH and (iii) solvent polarity (19-20). Table 1 shows that the physicochemical properties (e.g. size, charge, shape and hydration free energy) of anions such as $TcO_4^-$, $ReO_4^-$, and $I^-$ are similar to those of $ClO_4^-$. This strongly suggests that perchlorate selective QPEI resins may also be used to extract $TcO_4^-$, $ReO_4^-$, and $I^-$ from aqueous solutions and mixtures. $TcO_4^-$ and $I^-$ are, respectively, the dominant species of $^{99}$Tc and [129]I. See Icenhower, J. P. et al. (2010), "The biogeochemistry of technetium: a review of the behavior of an artificial element in the natural environment," *American Journal of Science* 310: 721-752; Hou X et al. (2009), "A review on speciation of iodine-129 in the environmental and biological samples," *Anal. Chim. Acta.* 632: 181-196. These two radionuclides are among the most problematic radionuclides in the environment due to their high inventory, long half-life, and high mobility. Similarly, $ReO_4^-$ is one the major species of Re, a valuable and expensive metal used in the manufacturing of jet engines and catalysts.

EXPERIMENTAL PROCEDURES

Several examples are described. Unless otherwise stated, the experimental details for the Examples are as follows:

All chemicals were reagent grade or better and were used as received. Unless otherwise stated, all salts used were anhydrous potassium salts and were obtained from Alfa Aeasar. Anhydrous sodium perchlorate (NaClO$_4$) were obtained from Alfa Aesar (ACS, >98%). Polyethyleneimine (PEI) (SP-200, $M_n$ 10,000) was donated by Nippon Shokubai Co., Ltd. Sulfonic 100 (branched dodecyl benzene sulfonic acid, 97%) was obtained from Stepan Company. Commercial ion exchange resins were generously supplied by the respective manufacturer as follows: PUROLITE A-850 and A-530E from The PUROLITE Company, Bala Cynwyd, Pa.; and DOWEX 1 from Dow Chemical Company, Dow Center Midland, Mich. PUROLITE A-850 is a type 1 gel-type acrylic resin and A-530E is a bifunctional macroporous styrene resin. DOWEX 1 is a type 1 marcoporous styrene based resin. All laboratory-prepared resins were synthesized from and converted to the chloride form at AquaNano, LLC, Monrovia, Calif. Each resin was characterized by exchange capacity and moisture content. Deionized water was obtained from an Academic Milli-Q filtration unit (minimum resistivity 18MEΩ).

For uniformity, all resins were initially in the chloride form prior to equilibration with matrix solutions. Unless otherwise stated, all resins were treated by washing successively with 1.0 N HCl (1 L/110 g of resin), deionized water until the pH of the eluate was neutral, 5 wt % NaCl (1 L/10 g resin), and again with deionized water (1 L/10 g resin). Resins 4 and 5 were treated by stirring resins in a pressure vessel containing 5 wt % NaCl (1:5 EtOH solution). The vessel was heated to 60° C. for 1 h, and then the supernatant was dumped. Treatment in pressure was repeated twice for resins 4 and 5 before undergoing the successive treatment washes as described above done on all other resins. After wash treatment, resins were then partially dried to a slightly moist consistency by filtration through a Büchner funnel. Water content of Büchner dried resins was performed by drying 1 g of resin for 8 h at ambient temperature under reduced pressure and reweighed the dried resin. The strong-base exchange capacity (SBEC) for all resins was determine by performing a Mohr titration in accordance to ASTM 2187 sections 59-66. Each resin was packed in a column where the chloride counter-ions were displaced using sodium nitrate. The effluent was collected and the concentration of chloride was measured by titrating with a known concentration of silver nitrate. The chloride concentration corresponds to the available quaternary exchange sites. The SBEC and the water content are listed in Table 2; SBEC is listed on both volume and mass basis.

TABLE 2

Strong-base exchange capacity and percent moisture of resins.

| Resin | SBEC (mequiv/mL) | SBEC (mequiv/g) | Water content (%) | Functional/alkyl group |
|---|---|---|---|---|
| 1 | 2.7 | 5.34 | 41.8 | methyl |
| 2 | 1.8 | 4.48 | 43.8 | butyl |
| 3 | 0.7 | 1.38 | 23.8 | hexyl |
| 4 | 1.4 | 2.08 | 25.0 | hexyl, ethyl |
| 5 | 1.23 | 2.33 | 37.9 | isobutyl, propyl |
| PUROLITE A-850 | 1.25 | 3.90 | 47.7 | Trimethylammonium |
| DOWEX 1 | 1.4 | 4.43 | 45.5 | Trimethylammonium |
| PUROLITE A-530E | 0.6 | 3.44 | 53.5 | Triethyl- and trihexyl-ammonium |

Ion chromatography (IC) analyses were performed with a Dionex ICS-2000 equipped with an electrolytic suppressor (CSRS-300 4 mm), dual piston pump, potassium hydroxide eluent generator cartridge (EGCIII), heated conductivity cell, an AS40 autosampler, 4×250 mm AS20 analytical column, and 4×50 mm AG20 guard column. External water mode was employed as described in EPA method 314.0. The analytical detection limit was about 1.5 µg/L.

Scanning electron microscopy (SEM, JEOL JEM-2100F HR) was used to image microcapsules mounted on carbon-tape covered stages. SEM images were acquired after sputter-coating the samples with platinum.

Determination of distribution coefficients ($K_d$) for $ClO_4^-$ sorption on resins was determined by bringing 50 mg (dry weight equivalent) of resin in contact with a solution containing $ClO_4^-$ (50 mL of test solution). An aliquot of sample was taken after 24 h of continuous shaking on a rotisserie shaker and filtered with a PTFE syringe filter (0.45 µm). The samples were then analyzed for $ClO_4^-$ concentration by IC as described above.

The effectiveness of $ClO_4^-$ desorption by NaCl (1 N, ~5.8 wt %) was determined by contacting 0.1 g of resin (dry weight equivalent) with a 50-mL test solution containing 200 mg/L $ClO_4^-$. Samples were shaken overnight, and the supernatant was then decanted and analyzed for $ClO_4^-$ via IC as described above. The amount of $ClO_4^-$ adsorbed by the resin was calculated as the difference between the initial amount of $ClO_4^-$ added and the amount found at equilibrium. Desorption was then induced by rinsing twice with 50 mL of deionized water to remove residual $ClO_4^-$ in the resin after sorption; it was subsequently equilibrated in 50 mL of 1 N NaCl. At different time intervals (0.5, 1, 2, 4, 12, and 24 h), an aliquot (0.1 mL) of supernatant solution was sampled, and after proper dilution with deionized water and filtration through DIONEX OnGuardII Ag cartridge (to precipitate excess chloride), the supernatant was analyzed using the IC parameters shown above.

Figure 14:
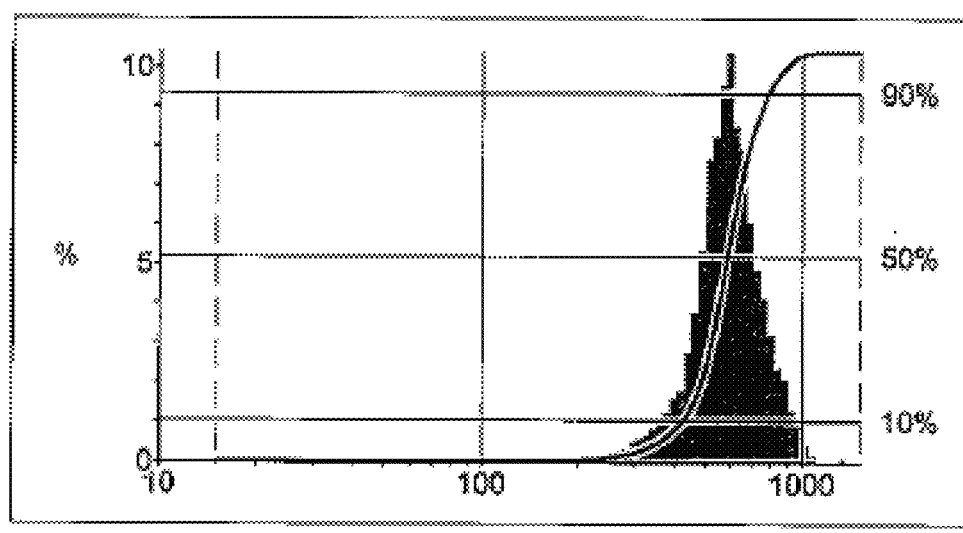
FIG. 14 is a histogram showing a size distribution of PEI-1.

The particle size distribution was analyzed using a particle-sizer (BECKMAN COULTER RapidVue). Particle size was for the PEI-1 is 597.4±148.01 µm. See FIG. 14 for the corresponding histogram.

Example 1: Synthesis of Example Resins

The following abbreviations are used herein: "ECH" refers to epichlorohydrin. "BCP" refers to 1-bromo-3-chloropropane. "HCl" refers to hydrochloric acid. "DMF" refers to dimethylformamide. "MeOH" refers to methanol. "EtOH" refers to ethanol. "IPA" refers to isopropanol. "NaOH" refers to sodium hydroxide. "MeI" refers to methyliodide. "DIPEA" refers to diisopropylethylamine. "RT" refers to room temperature, or approximately 25° C.

Synthesis of Base PEI Resin (HPR).

In general accordance with the scheme of FIG. 2, a solution of 86 g of 36-38% HCl in 138 g of DI water was added to the reaction flask containing 100 g of PEI over a course of 10 min at ambient temperature under nitrogen. Then a solution of 4 mg of surfactant Sulfonic 100 in 1.1 M NaOH (30 wt %) was then added to the vessel, followed by addition of 450 mL of toluene. The heating bath temperature was then brought to 80° C. In a separate vessel, 50 g ECH and 100 g BCP toluene solution (40 wt %) was prepared. Using an addition funnel, the ECH solution was added over a 60 min period and then the reaction was continued for an additional 2 h before beginning a dehydration using a dean stark apparatus (bath temperature about 110° C.). The reaction end point was reached when all the water from the system had been removed. After temperature cooled to ambient temperature the resins were collected by filtration over a Büchner funnel and were purified by washing with methanol and washing with a 20 wt % solution of NaOH (to remove the surfactant). The beads were then washed twice with deionized water to remove excess NaOH. Büchner dried beads were then stored in 50 mL polypropylene centrifugal tubes at RT.

Synthesis of Resin 1.

Figure 4:
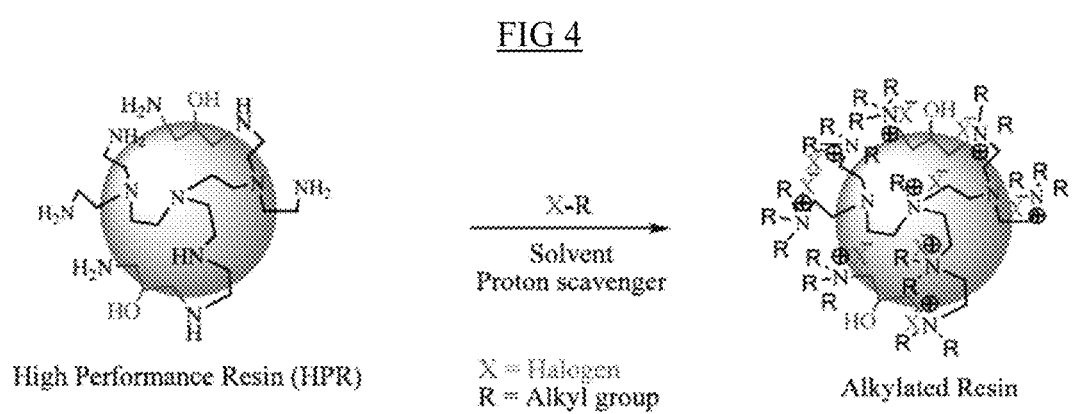
FIG. 4 is a diagram and chemical equation illustrating a reaction scheme for the production of an alkylated resin. In another embodiment, R may be hydrogen rather than an alkyl group.

In general accordance with the scheme of FIG. 4, 50 mL EtOH (methanol may be used instead, in another embodiment) was added into a 250 mL pressure vessel containing 25 g of Büchner dried base PEI resin (HPR). Then 80 g MeI and 20 mL of DIPEA (proton scavenger) was added to the mixture. Reaction was stirred and heated to 60° C. in a heating bath for 6 h. After temperature cooled to RT, resins were collected by filtration over a Büchner funnel. Resins were washed successively with MeOH (1 L/110 g of resin) to remove organic reagents and byproducts, and then with deionized water (1 L/10 g of resin). Resin was then converted to chloride form as described in the treatment procedure above.

Synthesis of Resin 2.

Figure 15:
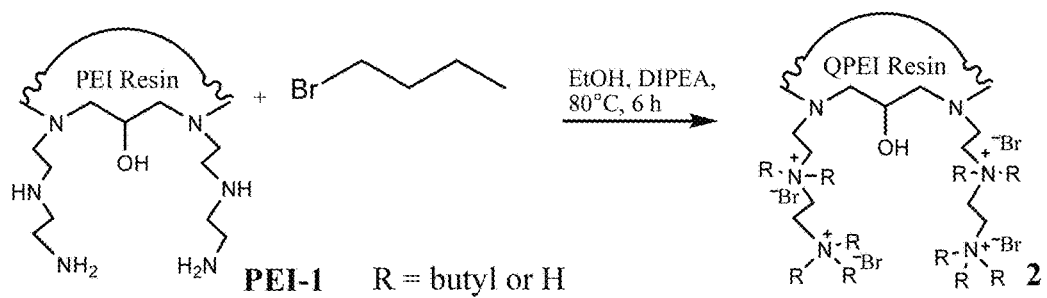
FIG. 15 is a chemical equation illustrating a functionalization of PEI-1 to create Resin 2.

In general accordance with the scheme of FIG. 15, 50 mL EtOH was added into a 250 mL pressure vessel containing 25 g of Büchner dried HPR for Resin 2. 100 g 1-bromobutane and 20 mL of was added to the mixture. Reaction was stirred and heated to 80° C. in a heating bath for 6 h. After temperature cooled to RT, resins were collected by filtration over a Büchner funnel. Resins were washed successively with MeOH (1 L/110 g of resin), and then with deionized water (1 L/10 g of resin). Resin was then converted to chloride form as described in the treatment procedure above.

Synthesis of Resin 3.

Figure 16:
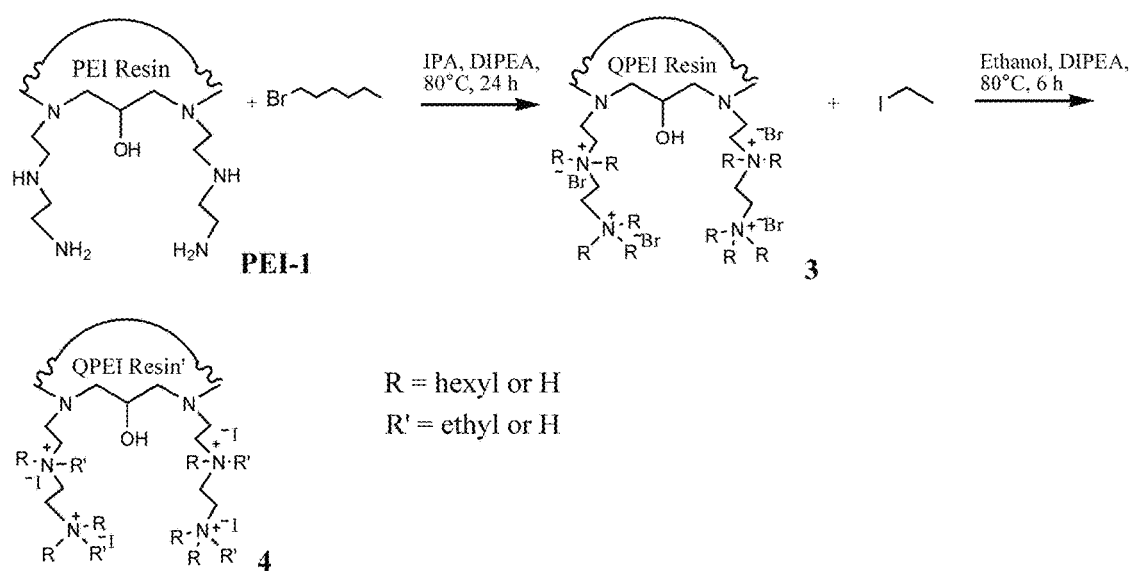
FIG. 16 is a chemical equation illustrating a functionalization of PEI-1 to create Resin 3.

In general accordance with the scheme of FIG. 16, 75 mL IPA was added into a 250 mL pressure vessel containing 40 g of Büchner dried HPR. 100 g 1-bromohexane and 20 mL of was added to the mixture. Reaction was stirred and heated to 80° C. in a heating bath overnight. After temperature cooled to RT, resins were collected by filtration over a Büchner funnel. Resins were washed successively with MeOH (1 L/110 g of resin) and then with deionized water (1 L/10 g of resin). Resin was then converted to chloride form as described in the treatment procedure above.

Synthesis of Resin 4.

40 mL EtOH was added into a 250 mL pressure vessel containing 25 g of Büchner dried Resin 3. Then 50 g 1-iodoethane and 20 mL of DIPEA was added to the mixture. Reaction was stirred and heated to 0° C. in a heating bath for 6 h. After temperature cooled to RT, resins were collected by filtration over a Büchner funnel. Resins were washed successively with MeOH (1 L/10 g of resin) and then with deionized water (1 L/10 g of resin). Resin was then converted to chloride form as described in the modified treatment procedure above.

Synthesis of Resin 5.

Figure 17:
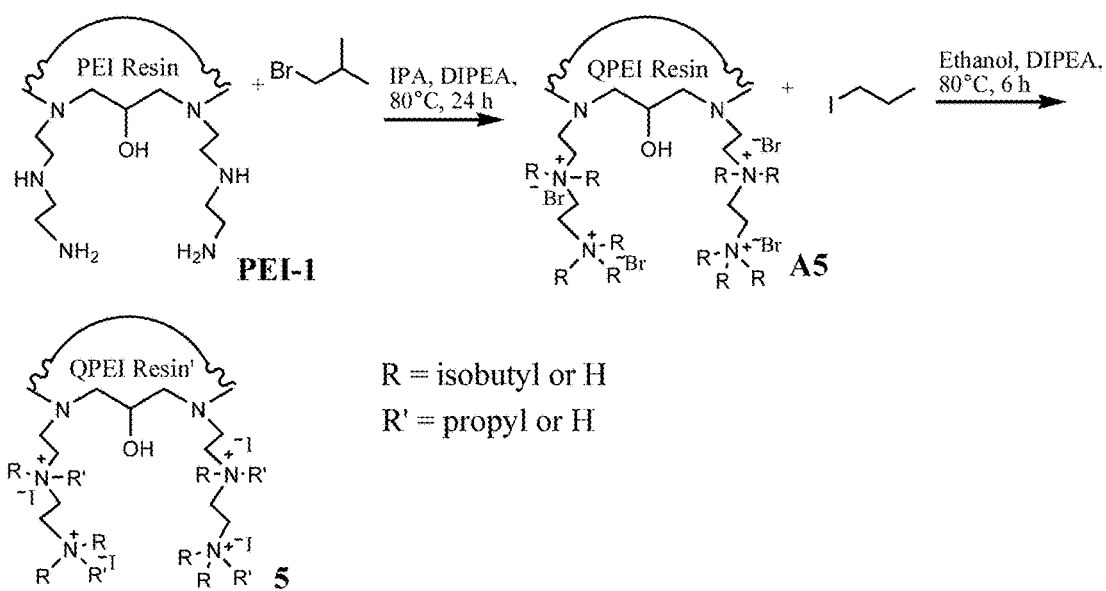
FIG. 17 is a chemical equation illustrating a functionalization of PEI-1 to create Resin 5.

In general accordance with the scheme of FIG. 17, 75 mL IPA was added into a 250 mL pressure vessel containing 40 g of Büchner dried PEI-1.100 g 1-bromohexane and 20 mL of was added to the mixture. Reaction was stirred and heated to 80° C. in a heating bath overnight to afford A5. Supernatant was then decanted and 75 mL EtOH was added to A5. Then 50 g 1-iodoethane and 20 mL of DIPEA was added to the mixture. Reaction was stirred and heated to 80° C. in a heating bath for 6 h. After temperature cooled to RT, resins were collected by filtration over a Büchner funnel. Resins were washed successively with MeOH (1 L/10 g of resin) and then with deionized water (1 L/10 g of resin). Resin was then converted to chloride form as described in the modified treatment procedure above.

Example 2: Comparison of QPEI Resin Sorption Against Sorption of Commercial Resins Batch sorption studies are described which evaluate the performance of the QPEI resins against representative commercial resins. Perchlorate sorption onto the resins was measured by mixing varying amounts of media (25, 50, 100, 150, 200, and 250 mg in dry weight) with 50 mL of a test solution containing 625 ppb (g/L) of perchlorate. The test solution was representative of a contaminated groundwater from Redlands (California) that was employed in a previous study of perchlorate-selective resins conducted by Oak Ridge National Laboratory. See Gu, B. H. et al. (1999), "Selective anion exchange resins for the removal of perchlorate ($ClO_4^-$) from groundwater," Oak Ridge National Laboratory Report ORNL/TM-13753. The makeup Redlands groundwater was prepared by dissolving 3 mM NaHCO$_3$, 1 mM CaCl$_2$, 0.5 mM MgCl$_2$, 0.5 mM Na$_2$SO$_4$, and 0.5 mM KNO$_3$ in deionized water. Table 3 lists the concentration of perchlorate and competing anions in the simulated Redlands groundwater matrix.

TABLE 3

Concentration of perchlorate and competing anions in a Redlands makeup ground water.[a]

| Anion | Concentration | Unit |
|---|---|---|
| $ClO_4^-$ | 625 | µg/L |
| $Cl^-$ | 106 | mg/L |
| $NO_3^-$ | 31 | mg/L |
| $HCO_3^-$ | 183 | mg/L |
| $SO_4^{2-}$ | 49 | mg/L |

[a]The test solution was a simulation of a typical contaminated groundwater found in Redlands California. The makeup ground water was prepared by dissolving 3 mM of NaHCO$_3$, 1 mM of CaCl$_2$, 0.5 mM MgCl$_2$, and 0.5 mM Na$_2$SO$_4$, and 0.5 mM KNO$_3$ in deonized water.

Following Gu & Brown (2006), the resin-water distribution coefficient $K_d$ (mL/g) of perchlorate was expressed as:

$$K_d = \frac{(C_i - C_f)/M}{C_f} \quad \text{Eq. 1}$$

where $C_i$ and $C_f$ are, respectively, the initial and final concentrations of $ClO_4^-$ (mg/L) in solution and M is the mass of resin per unit volume of solution (mg/L). $K_d$ was subsequently used to calculate the normalized resin-water distribution coefficient $K^{Eq}$ (mL/meq) as given below:

$$K_d^{Eq} = \frac{K_d}{SBEC} \quad \text{Eq. 2}$$

where SBEC (meq/g) is the strong-base exchange capacity (SBEC) of each resin as measured by Mohr titration. See Bonnesen, P. V. et al. (2000), "Development of bifunctional anion-exchange resins with improved selectivity and sorptive kinetics for pertechnetate: batch-equilibrium experiments," Environ. Sci. Technol. 34: 3761-3766. The final $K_d$ and $K_d^{Eq}$ values reported in Table 4 are the average of 6 measurements after 24 hours of equilibration time.

TABLE 4

$ClO_4^-$ Distribution Coefficients for Selected QPEI Beads and Commercial Resins.

| Resin | [a]SBEC (eq/L) | [a]SBEC (meq/g) | Water Content (%) | [b]$K_d$ (mL/g) | [c]$K_d^{Eq}$ (mL/meq) | Resin Backbone | Quaternary Amine Alkyl Group |
|---|---|---|---|---|---|---|---|
| CJ-1 | 2.70 | 5.34 | 41.8 | 7359 | 1379 | PEI | Methyl |
| CJ-2 | 1.80 | 4.48 | 43.8 | 48906 | 10917 | PEI | Butyl |
| CJ-3 | 0.70 | 1.38 | 23.8 | 233318 | 169071 | PEI | Hexyl |
| CJ-4 | 1.40 | 2.08 | 25.0 | 295490 | 142062 | PEI | Hexyl and Ethyl |
| CJ-5 | 1.23 | 2.33 | 37.9 | 123098 | 52832 | PEI | Isobutyl and Propyl |
| PUROLITE A-850 | 1.25 | 3.90 | 47.7 | 3617 | 927 | Acrylic-DVB | Trimethyl |

TABLE 4-continued

ClO$_4^-$ Distribution Coefficients for Selected QPEI Beads and Commercial Resins.

| Resin | $^a$SBEC (eq/L) | $^a$SBEC (meq/g) | Water Content (%) | $^b$K$_d$ (mL/g) | $^c$K$_d^{Eq}$ (mL/meq) | Resin Backbone | Quaternary Amine Alkyl Group |
|---|---|---|---|---|---|---|---|
| DOWEX 1 | 1.40 | 4.43 | 45.5 | 97398 | 21980 | Styrene-DVB | Trimethyl |
| PUROLITE A-530E | 0.60 | 3.44 | 53.5 | 195422 | 56795 | Styrene-DVB | Triethyl and Trihexyl |

$^a$The strong-base exchange capacity (SBEC) of each resin was measured by Mohr titration.

$^b$The resin-water distribution coefficient K$_d$ (mL/g) of perchlorate was expressed as:

$$K_d = \frac{(C_i - C_f)/M}{C_f}$$

; where $C_i$ and $C_f$ are, respectively, the initial and final concentrations of perchlorate (mg/L) in solution and M is the mass of resin per unit volume of solution (mg/L).

The final K$_d$ values reported in Table 3 are the average of 6 measurements after 24 hours of equilibration time.

$^c$The K$_d$ was subsequently used to calculate the normalized resin-water distribution coefficient K$^{Eq}$ (mL/meq) as given below:

$$K_d^{Eq} = \frac{K_d}{SBEC}$$

; where SBEC (meq/q) is the strong-base exchange capacity (SBEC) of each resin as measured by Mohr titration.

Figure 7A:
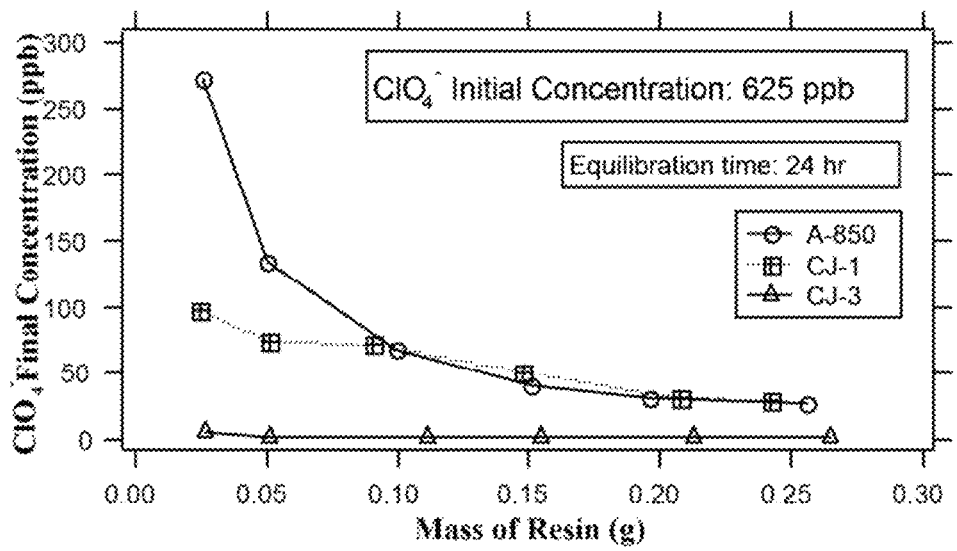
FIG. 7A is a graph illustrating the effect of resin mass on the final $ClO_4^-$ concentration from the Redlands makeup groundwater solution.
Figure 7B:
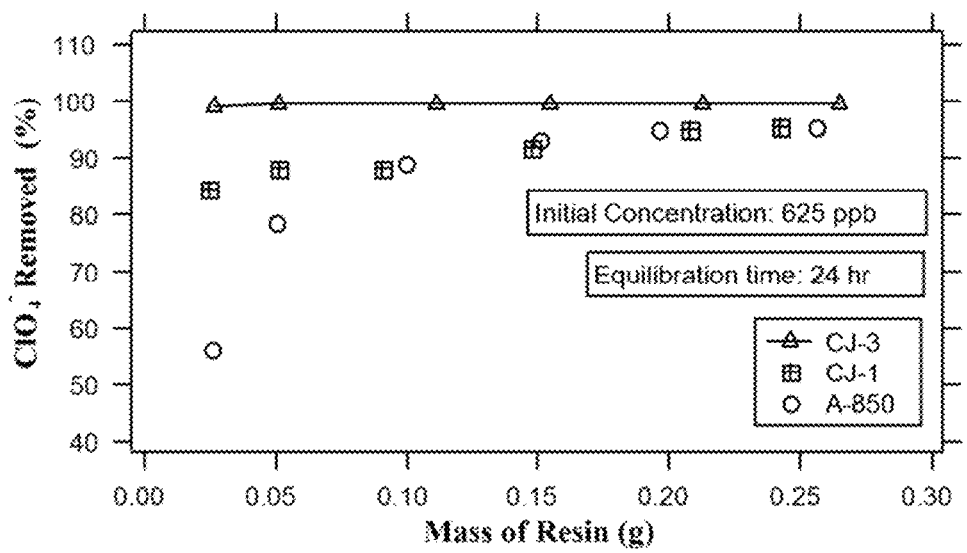
FIG. 7B is a graph illustrating the percentage of $ClO_4^-$ removed.

Table 4 lists the measured K$_d$ and K$_d^{Eq}$ values for the QPEI beads and commercial resins. The distribution coefficient K$_d$ is often employed as a measure of the sorption capacity of trace anions by ion exchange resins in aqueous solutions per unit mass of media (Gu & Brown, 2006; Gu et al. 1999). Conversely, the normalized distribution coefficient K$_d^{Eq}$ can be used as a measure of the anion sorption affinity/selectivity of the resins per exchange site of media (Bonnesen et al. 2000). The magnitudes of the K$_d$ and K$_d^{Eq}$ values of the QPEI 1-3 resins clearly indicate their selectivity for perchlorate increases with resin hydrophobicity (Table 1). This is consistent with previous measurements showing that in aqueous solutions and model electrolyte solutions a G5-NH$_2$ PPI dendrimer provides a more favorable environment for the partitioning of perchlorate anions than the more hydrophilic G4-NH$_2$ PAMAM dendrimer (Diallo et al. 2007). This observation is also consistent with the preferential sorption of perchlorate onto the styrene-DVB DOWEX-1 resin over the more hydrophilic acrylic-DVB PUROLITE A-850E resin. Table 4 also shows that the QPEI 3 resin with hexyl quaternary ammonium groups has a higher ClO$_4^-$ selectivity (i.e. K$_d^{Eq}$ value) than the PUROLITE A-530E resin with trihexyl and triethyl quaternary ammonium groups even though both resins have volumetric SBEC (0.6-0.7 eq/L). Note that the bifunctional QPEI 4 resin with hexyl and ethyl quaternary ammonium groups has larger exchange capacity (1.4 eq/L) and higher perchlorate K$_d$ and K$_d^{Eq}$ values than the A-530E resin. FIGS. 7A and B show the selective QPEI resin CJ-3 can remove perchlorate from the Redlands makeup groundwater solution to below detection limit (~2 ppb). Conversely, the non-selective resins (QPEI CJ-1 and PUROLITE A-850) are not able to remove perchlorate below detection limit even at higher resin loads.

Figure 8:
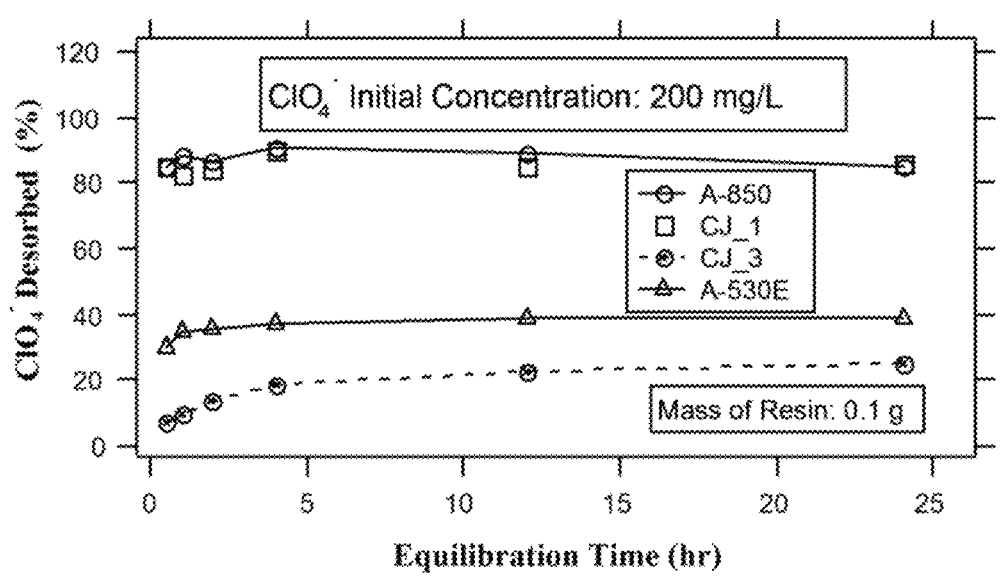
FIG. 8 is a graph illustrating the extent of $ClO_4^-$ desorption for selected QPEI and commercial resins in 5.8 wt % (1.0 M) NaCl as a function of equilibration time.

Example 3: Comparison of QPEI Resin Desorption Against Desorption of Commercial Resins Batch desorption studies are described which evaluate the desorption of perchlorate from selected QPEI and commercial resins. For each resin, 0.1 g of dry media was first equilibrated overnight with a 50 mL solution of Redlands makeup groundwater containing 200 mg/L of ClO$_4^-$. Following the determination of the amount of ClO$_4^-$ sorbed by each media, the supernatant solutions were decanted. Each media was subsequently washed twice with a 50 mL aliquot of deionized water to remove residual and unbound ClO$_4^-$. Following this, each resin was equilibrated with an aqueous solution of 5.8 wt % NaCl to induce desorption through the exchange of Cl$^-$ ions with the sorbed ClO$_4^-$ ions. FIG. 8 shows limited extent of ClO$_4^-$ desorption (<50%) from the most selective resins (CJ-3 and PUROLITE A-530E). Conversely, the least selective resins (CJ-1 and PUROLITE A-850) exhibit a high extent of ClO$_4^-$ desorption (>80%). The results are consistent with previous studies showing that perchlorate-selective resins have low regeneration efficiency in conventional brine (~12 w % NaCl solution) (Gu & Brown 2006; Tripp & Clifford 2006; Lehman et al. 2008; Gu, Brown & Chiang 2007). The overall results of the sorption and desorption studies indicate the QPEI CJ-3 resin has a higher ClO$_4^-$ selectivity than the PUROLITE A-530E. To our knowledge, the bifunctional A-530E resin has the highest ClO$_4^-$ selectivity among all commercial styrene-DVB resins (Gu, Brown & Chiang 2007).

Figure 9:
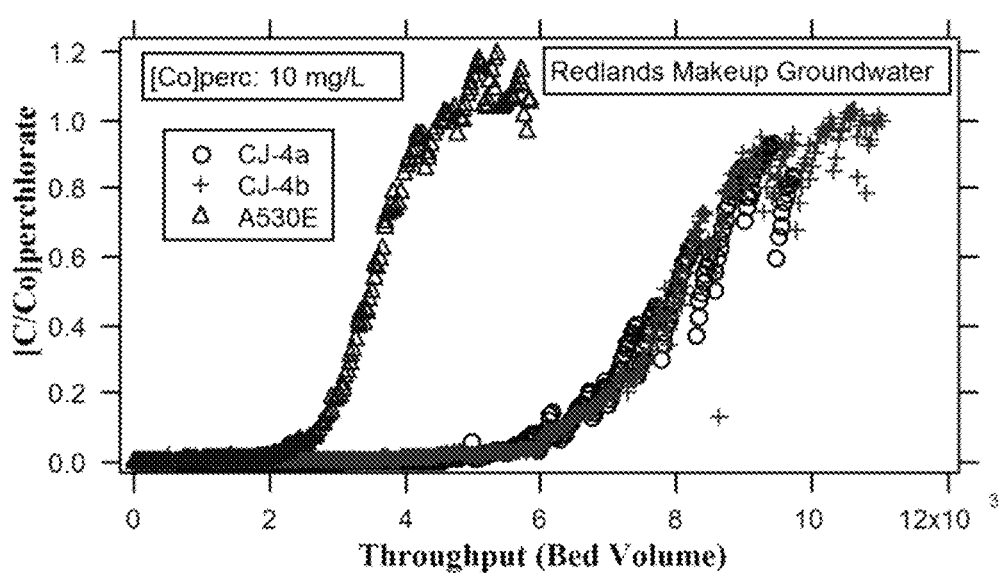
FIG. 9 is a graph illustrating perchlorate breakthrough curves of QPEI CJ-4 and PUROLITE A530E resins.

Example 4: Comparison of Operational Capacity of QPEI CJ-4 Resin with Bifunctional A-530E Resin Column studies are described which compare the operational capacity of the bifunctional QPEI CJ-4 resin against the bifunctional A-530E resin. Both resins have high selectivity for ClO$_4^-$ and contain hexyl/ethyl quaternary ammonium exchange sites. Two different batches of QPEI CJ-4 resin were synthesized. The first batch (CJ-4-a) yielded a QPEI resin with a SBEC of 1.40 eq/L. The second batch (CJ-4-b) produced a SBEC of 1.9 eq/L. To compare the operational capacity of the resins while reducing the length of the column experiments, accelerated breakthrough experiments were carried out using Redlands makeup groundwater containing an initial ClO$_4^-$ concentration of 10 mg/L. The ion exchange mini-column consisted of 3-3.4 mL of resins (Cl form) that were packed in a 0.7-cm-inner-diameter glass chromatography column, resulting in a bed depth of 8 cm. Test solutions were pumped through the mini-columns with a flow rate of 3.0 mL/min through a peristaltic pump, Model EP-1 ECONO PUMP (Bio-Rad Laboratories). The system had an empty bed contact time of 1 min and a superficial linear velocity of 8 cm/min (1,440 BV/d). FIG. 9 shows the $ClO_4^-$ breakthrough curves of the media.

Table 5 summarizes the results of the breakthrough experiments. Using the volume of water treated (Gallons) per volume of media (cubic foot) at 30% breakthrough as measure of operational capacity, we find that the operational capacity (OC) of both the QPEI CJ-4a and CJ-4-b resins are ≥2.20× than that of the PUROLITE A-530E (Table 5). The overall results of the sorption and column studies indicate the QPEI CJ-3 resin has a higher $ClO_4^-$ selectivity and operational capacity (by more 2.2×) than the PUROLITE A-530E. It appears that the bifunctional A-530E resin may have the highest $ClO_4^-$ selectivity and operational capacity among all commercial styrene-DVB resins (Gu, Brown & Chiang 2007).

TABLE 5

Comparison of Operational Capacity for Perchlorate-Selective QPEI and Commercial Resins.

| Media | SBEC (eq/L) | SBEC Ratio | $[C/Co]_{perc}$ | Bed Volume | Media Volume (mL) | [a]Throughput (Gallons/Cubic Feet of Resin) | Performance Ratio |
|---|---|---|---|---|---|---|---|
| CJ-4a | 1.4 | 2.33 | 0.30 | 7558 | 3.4 | 56544 | 2.36 |
| CJ4-b | 1.9 | 3.17 | 0.30 | 7465 | 3.4 | 53662 | 2.24 |
| A-530E | 0.6 | 1.0 | 0.31 | 3200 | 3.0 | 23938 | 1.0 |

[a]The volume of water treated per volume of media at 30% breakthrough (i.e. $[C/Co]_{perc}$ = 0.3 was used as measure of the operational capacity of the perchlorate-selective resins.

Example 5: Characterization of Quaternized PEI Resin Beads

Figure 18A:
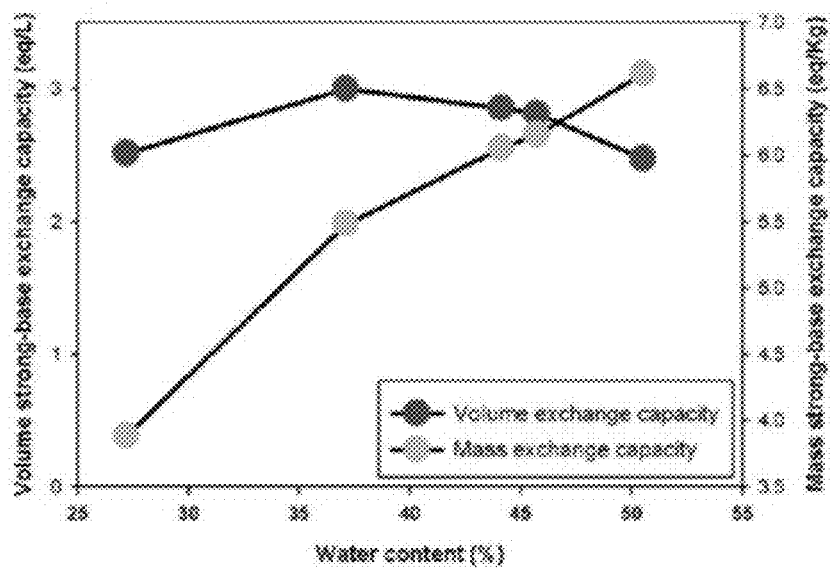
FIG. 18A is a graph comparing the volume and mass strong-base exchange capacity at various water contents for resin beads in which there was complete crosslinking and removal of water.
Figure 18B:
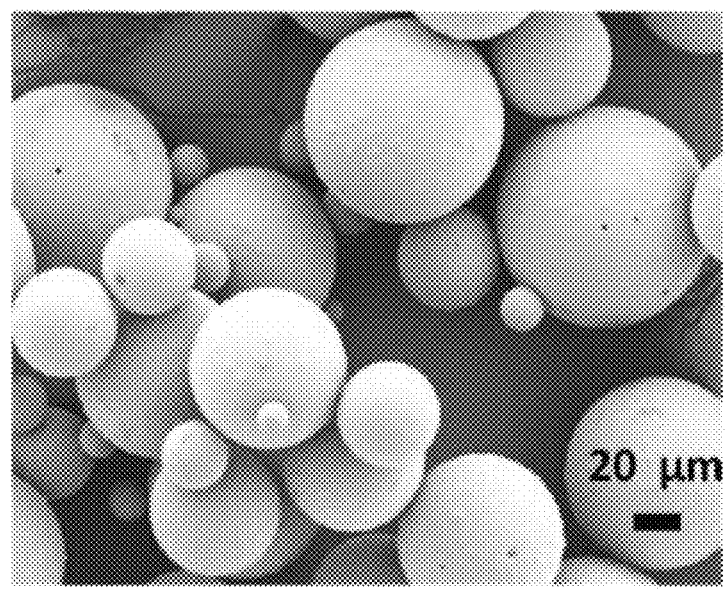
FIG. 18B shows corresponding resin beads with high exchange capacity.
Figure 19A:
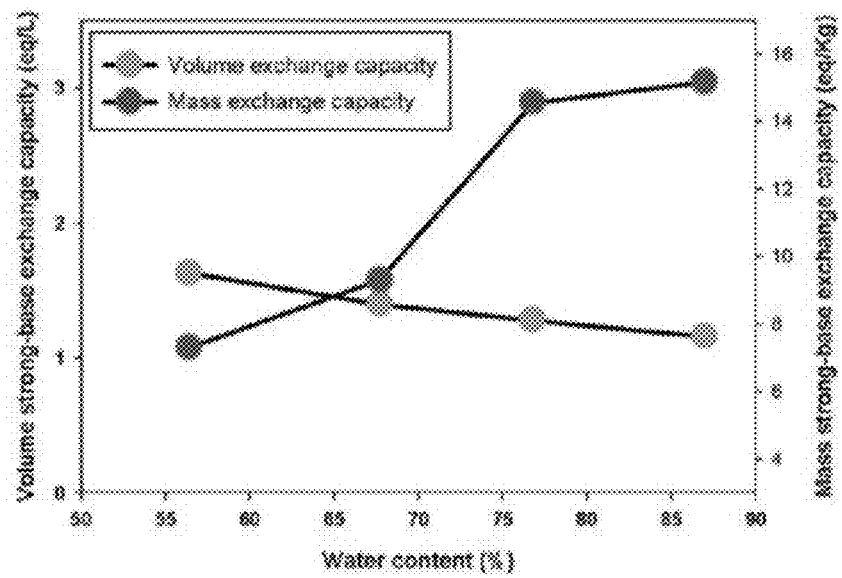
FIG. 19A is a graph comparing the volume and mass strong-base exchange capacity at various water contents for resin beads in which there was incomplete crosslinking and no step of dehydration.
Figure 19B:
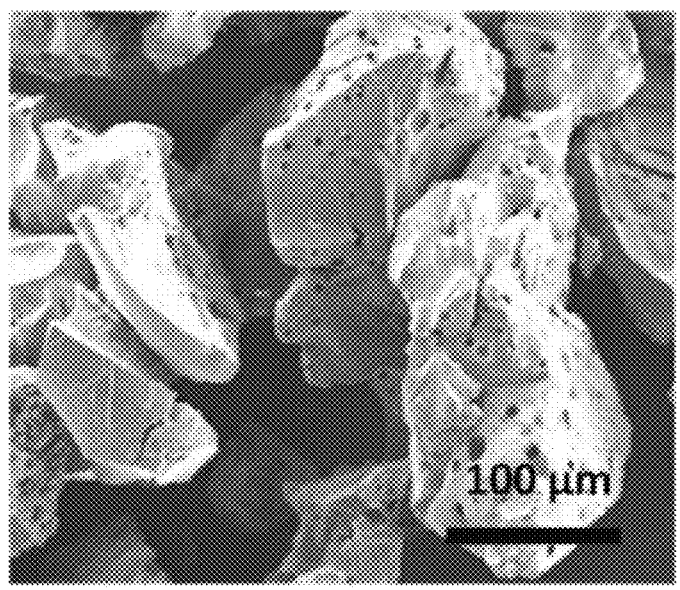
FIG. 19B shows corresponding resin beads with lower exchange capacity.
Figure 20A:
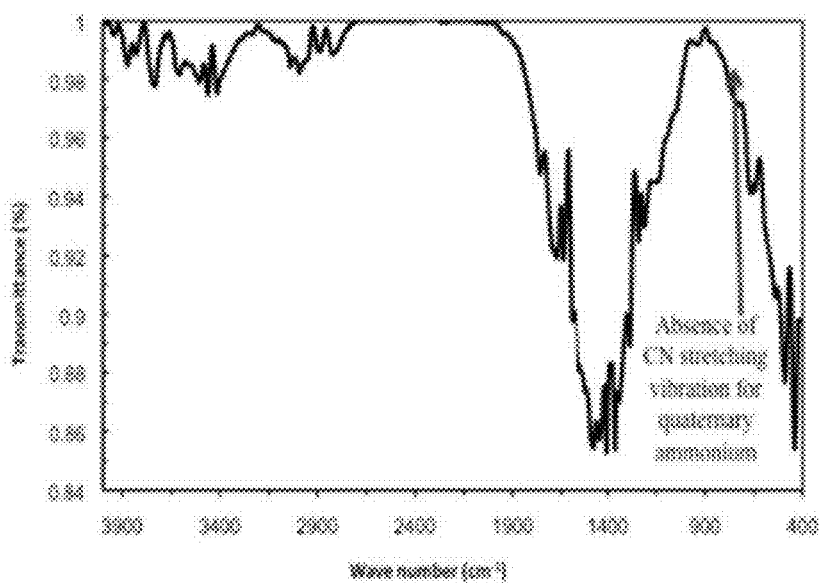
FIG. 20A is an FT-IR spectrograph of PEI resin beads prepared using the scheme of FIG. 2 (to create beads designated as HPR-2).
Figure 20B:
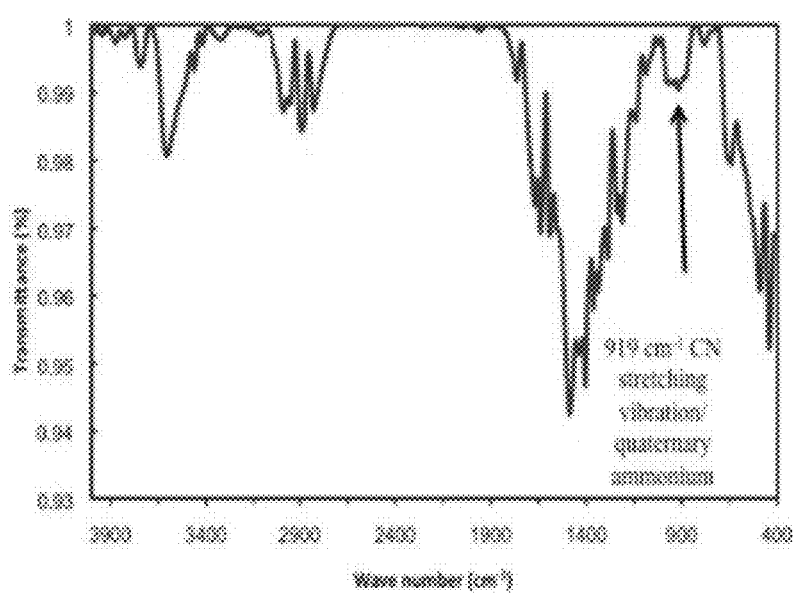
FIG. 20B shows the similar spectrograph for PEI resin beads with methyl quaternary ammonium groups (HPR-2M), as per the scheme of FIG. 4.
Figure 21:
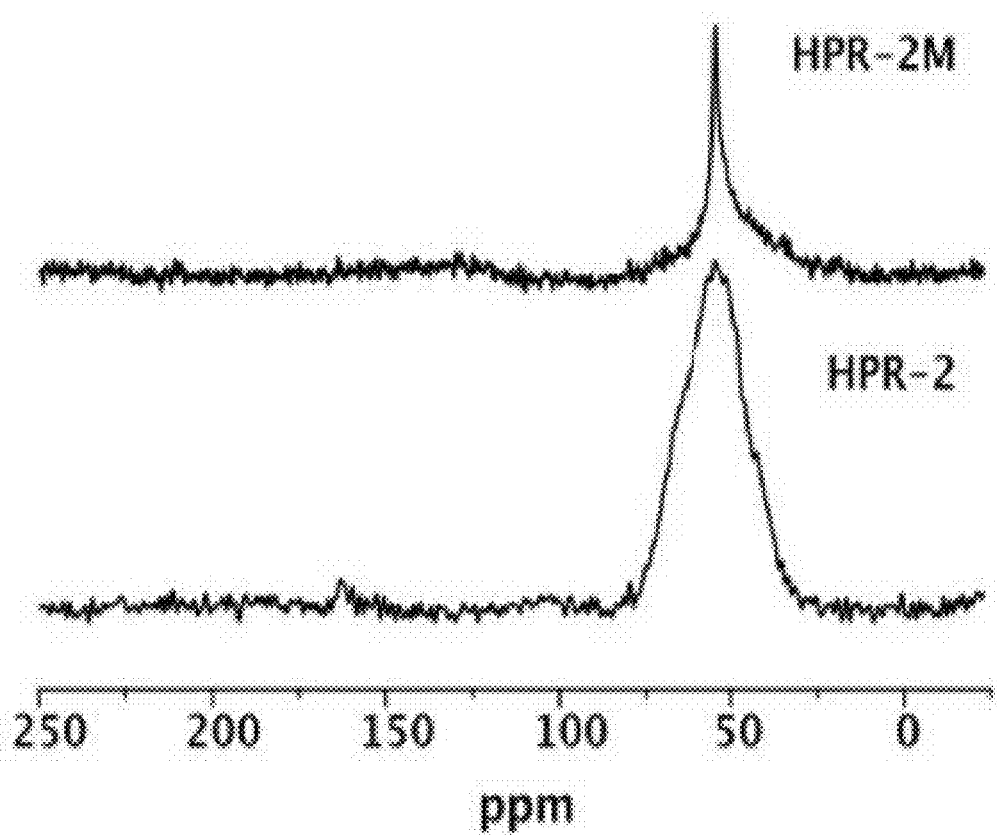
FIG. 21 is a graph showing $^{13}C$ NMR spectrographic lines for PEI resin beads prepared using the scheme of FIG. 2 (to create beads designated as HPR-2), and for PEI resin beads with methyl quaternary ammonium groups (HPR-2M), as per the scheme of FIG. 4.
Figure 22:
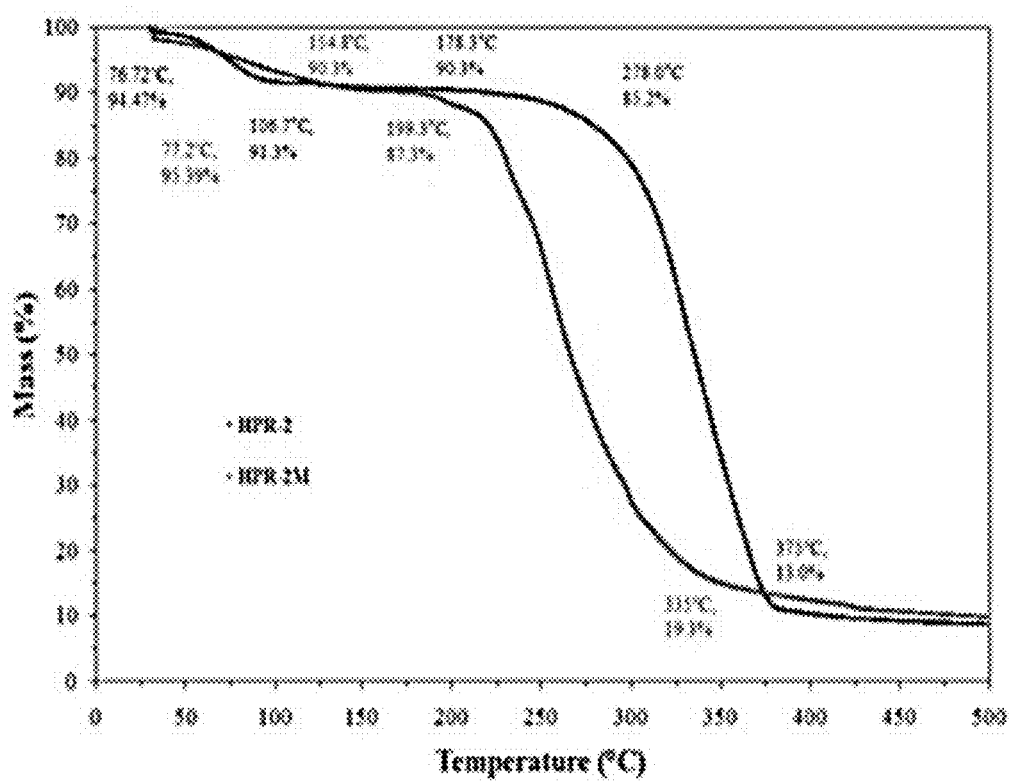
FIG. 22 is a graph showing thermogravimetric analysis (TGA) lines for PEI resin beads prepared using the scheme of FIG. 2 (to create beads designated as HPR-2), and for PEI resin beads with methyl quaternary ammonium groups (HPR-2M), as per the scheme of FIG. 4.

In this example, quaternization of the base PEI resin beads with iodomethane leads to ion exchange resin beads with methyl quaternary ammonium exchange sites (FIGS. 18A and B) and SBEC of 2.8-3.0 eq/L. In contrast, branched PEI resins prepared without a prior complete dehydration of the reaction mixtures at 110° C. generally displayed a more granular structure (FIG. 19B) with high water content (>50%) and SBEC only reaching 1.16-1.68 eq/L (FIG. 19A). FIG. 20A, FIG. 20B, and FIG. 21 show the FT-IR and 13C solid-state NMR spectra of a base PEI resin (designated as HPR-2) and the same resin after quaternization with iodomethane (HPR-2M). Both resins were synthesized using a precursor PEI macromolecule with Mn=1800 Dalton. The $^{13}C$ NMR spectrum of the bare PEI resin (HPR-2) displays a broad C—N peak with three unresolved shoulders at ~54.18 ppm corresponding to the primary, secondary and tertiary amine moieties of the resin. In contrast, a single, narrow and well-resolved C—N peak at ~54.18 ppm is seen in the spectrum of the PEI resin with methyl quaternary ammonium groups (HPR-2M). In addition, the quaternized PEI resin displays a carbon-nitrogen stretch at 919 $cm^{-1}$ in its IR spectrum, which is characteristic of quaternary ammonium groups (FIG. 20B) and is consistent with the $^{13}C$ NMR spectra. FIG. 22 shows the TGA curves of the base PEI resin and its fully quaternized counterpart. The base PEI resin (HPR-2) exhibits a three-step weight loss curve, which is consistent with literature data. The first weight loss, leveling off at ~77° C., is attributed to loss of water from the resin; this is followed by another dehydration process involving the hydroxyl group of the resin seen as a step leveling off at ~178° C. Finally, thermal decomposition of the base resin starts at 240° C. FIG. 22 shows a more complex weight loss pattern for the quaternized PEI resin (HPR-2M) with a first step leveling off at ~180° C. corresponding to the combined loss of water, OH groups and quaternary ammonium groups followed by thermal degradation of the resin.

Figure 23A:
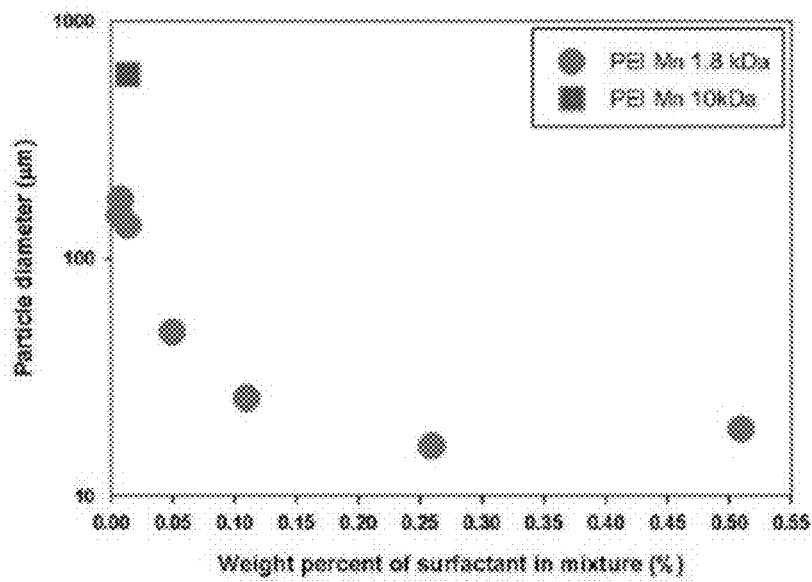
FIG. 23A is a graph of particle diameter versus the weight percent of surfactant in the mixture for various PEI resin beads.
Figure 23B:
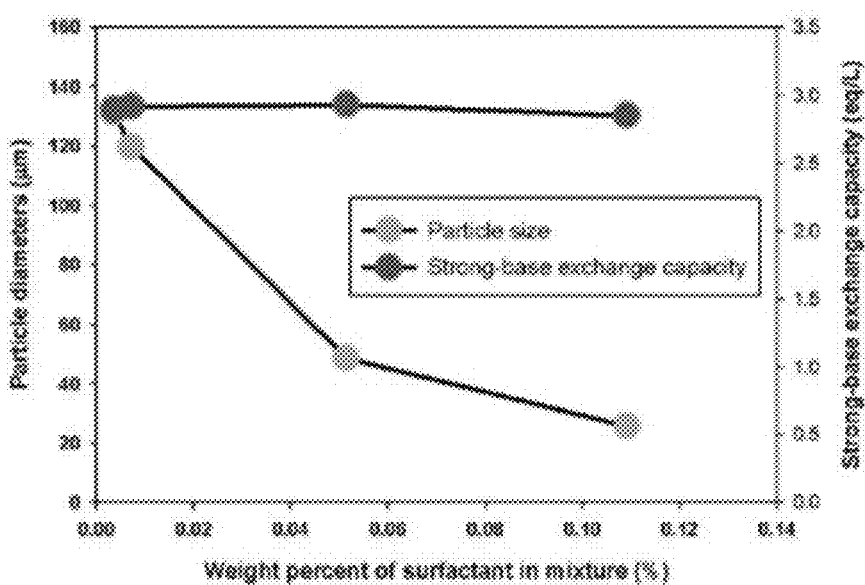
FIG. 23B shows a similar plot in which both particle size and strong-base exchange capacity are plotted on the same graph, versus weight percent of surfactant in a limited, small range.

FIGS. 23A and B illustrate the versatility of the new resin synthesis strategy in this example. By varying the weight fractions of surfactant in the water-in-toluene suspensions and the molar mass of the precursor PEI macromolecules, a series of HPRs were prepared with methyl quaternary ammonium groups and size ranging from 20 μm to 600 μm (FIGS. 23A and B). Here again, optimization of the water content of the resins during crosslinking was required to achieve resins with SBEC of ca. 2.8 eq/L (FIG. 23B). FIG. 23A highlights the effect of surfactant concentration on the size of the PEI resin beads. It is known in the art that the size and stability of water droplets in water-in-oil (W/O) emulsions may determine the size distributions of particles produced by inverse emulsion polymerization. It has been shown that in W/O emulsions, the size and stability of water droplets may be controlled by surfactant adsorption and subsequent reduction of the interfacial tension between the water and oil phases. FIG. 23A shows that the sizes of the resins prepared using PEI with molecular weight $M_n$=1800 Da decrease from an initial value of ~140 m to about 20 μm as the concentration of surfactant increases from 0.014 wt % to 0.51 wt %. In order to increase the size of the PEI beads to about 600 μm, a precursor PEI macromolecule was needed, with molar mass of about $M_n$=10,000 Da instead of the lower molar mass PEI with $M_n$=1800 Da.

Figure 5:
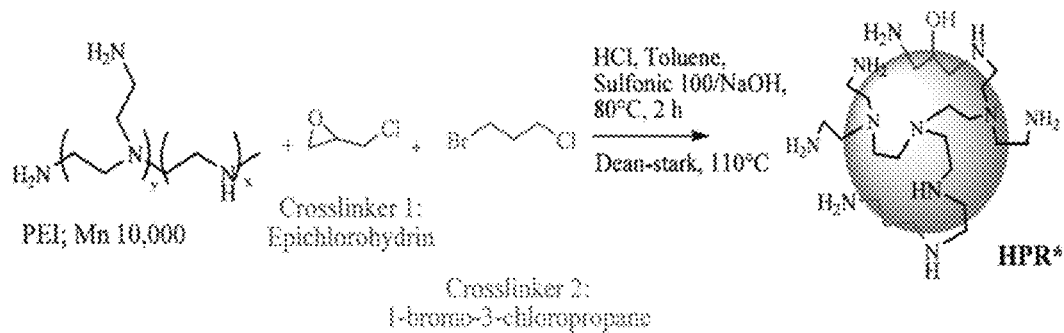
FIG. 5 is a diagram and chemical equation illustrating a reaction scheme for the production of a high performance resin using mixed crosslinking.

Although the PEI resins with methyl quaternary ammonium groups possess a high exchange capacity and can be used to remove a broad variety of anions from solutions, the selective extraction of toxic or valuable anions including perrhenate, pertechnetate and perchlorate is required in many environmental and industrial separation processes. Therefore, the use of the example high performance crosslinked PEI resins was investigated, to prepare novel highly selective resins suitable for the extraction of large and poorly hydrated anions such perchlorate ($ClO_4^-$), pertechnetate ($TcO_4^-$) and perrhenate ($ReO_4^-$) from aqueous solutions. $ClO_4^-$ is a persistent and widespread contaminant found in surface and groundwater in various locations including the United States. At high concentration, $ClO_4^-$ can inhibit the uptake of iodide by the thyroid gland and may disrupt its ability to produce hormones critical to developing fetuses and infants. $TcO_4^-$ is the dominant species of $^{99}Tc^{25}$. It is among the most problematic radionuclides in the environment due to its high inventory, long half-life (213,000 years) and high mobility in groundwater. $ReO_4^-$ is one the major species of Re, an expensive metal used in the manufacturing of jet engines and catalysts. Table 1 shows that $ClO_4^-$, $TcO_4^-$, and $ReO_4^-$ have comparable physicochemical properties including size, shape and hydration free energies, which are much less favorable than those of anions such $Cl^-$, $NO_3^-$, $HCO_3^-$ and $SO_4^{2-}$. Thus, based on our earlier studies of $ClO_4^-$ binding to a generation (G5-$NH_2$) poly(propyleneimine) [PPI] dendrimer and a G4-$NH_2$ poly(amidoamine) [PAMAM] dendrimer, it is expected that branched PEI resins with hydrophobic cavities containing quaternary amine groups would exhibit binding selectivity for $ClO_4^-$, $TcO_4^-$, and $ReO_4^-$ over competing anions in aqueous solutions. It is known that a bifunctional St-DVB resin with trihexyl and triethyl ammonium chloride groups can selectively remove trace amounts of $ClO_4^-$ and $TcO_4^-$ in contaminated groundwater in the presence of competing anions. Therefore, a two-step approach can be employed to synthesize branched PEI resins that can selectively remove $ClO_4^-$ and closely related anions such $TcO_4^-$ and $ReO_4^-$. First, a series of resins with tunable hydrophobicity may be prepared using mixtures of epichlorohydrin (ECH) and 1-bromo-3-chloropropane (BCP) (FIG. 5) to crosslink a precursor PEI with molar mass $M_n$=10000 Da.

Figure 6:
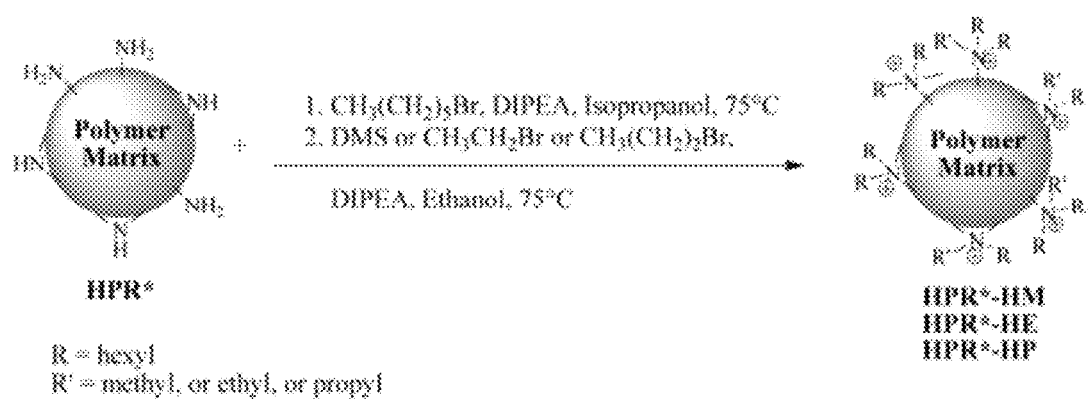
FIG. 6 is a diagram and chemical equation illustrating a reaction scheme for a method of producing a high performance resin.

Next, the base PEI beads (HPR*) may be quaternized through the sequential addition of 1-bromohexane followed by dimethyl sulfate, 1-bromoethane, or 1-bromopropane (FIG. 6). By optimizing the molar ratio of ECH to BCP in the water-in-toluene suspensions (FIG. 5) and the alkylation conditions (FIG. 6), three strong-base PEI resins may be synthesized, containing both (i) hexyl and methyl groups (HPR*-ME), (ii) hexyl and ethyl groups (HPR*-HM) and (iii) hexyl and propyl groups (HPR*-HP). To assess the performance of the bifunctional PEI resins, column studies of perchlorate extraction were carried out from a Redlands make-up groundwater sample. The composition of this water is found in Table 6. The test solution was a simulation of the typical contaminated groundwater found in Redlands Calif. The makeup ground water was prepared by dissolving 3 mM of $NaHCO_3$, 1 mM of $CaCl_2$, 0.5 mM $MgCl_2$, and 0.5 mM $Na_2SO_4$, and 0.5 mM $KNO_3$ in deonized water. Redlands makeup groundwater containing an initial $ClO_4^-$ was used to reduce the concentration of 10 mg/L to reduce the duration of the experiments by accelerating the breakthrough of perchlorate through the columns.

TABLE 6

Concentration of perchlorate and competing anions in the Redlands Makeup Groundwater.

| Anion | Concentration | Unit |
|---|---|---|
| $Cl^-$ | 106 | mg/L |
| $NO_3^-$ | 31 | mg/L |
| $HCO_3^-$ | 183 | mg/L |
| $SO_4^{2-}$ | 49 | mg/L |
| $ClO_4^-$ | 10 | mg/L |

Figure 24:
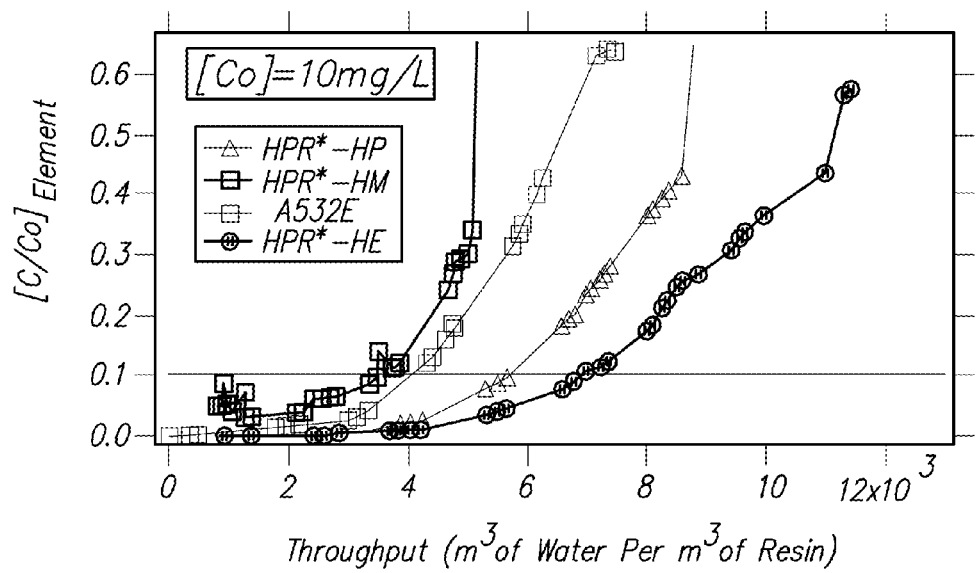
FIG. 24 is a graph of perchlorate breakthrough curves of the bifunctional PEI and Styrene-DVB resins in Redlands Makeup Groundwater.

The performance of the PEI bifunctional resins was also benchmarked against that of the bifunctional St-DVB resin PUROLITE A532E31. It appears that among all commercial St-DVB resins, the A532E resin provides the highest known selectivity and operational capacity for extraction of $ClO_4^-$ and $TcO_4^-$ from contaminated groundwater. FIG. 24 shows the $ClO_4^-$ breakthrough curves of the PEI resins. The volume of water treated ($m^3$) per volume of resin ($m^3$) at 10% breakthrough (i.e., [C/Co]=0.1) is used as a measure of the operational capacity (OC). FIG. 24 shows that the bifunctional PEI resins with hexyl+ethyl groups (HPR*-HE) and hexyl+propyl (HPR*-HE) outperform the commercial A532E resin by a factor of 1.7 and 1.4, respectively, in OC for perchlorate extraction from Redlands makeup groundwater. Not surprisingly, the OC advantages of these PEI resins (OC Ratio) over the A532E resin match the corresponding exchange capacity advantages (SBEC Ratio). In contrast, the bifunctional PEI resin with hexyl+methyl groups has a lower OC than the A532E resin despite of its high exchange capacity advantage (SBEC Ratio=2.3). These findings suggest that the exchange capacity and selectivity of our new PEI-based high performance resins can be tuned to improve the efficiency and economics of anion separations by ion exchange with multiple applications in environmental and industrial separations including water purification, metal extraction, nuclear fuel processing, and nuclear waste treatment.

While embodiments and applications have been shown and described, it would be apparent to those skilled in the art having the benefit of this disclosure that many more modifications than mentioned above are possible without departing from the inventive concepts disclosed herein. The invention, therefore, and the scope of the appended claims, should not be limited to the embodiments described herein.

What is claimed is:

1. A perchlorate-selective microparticle prepared by a method comprising:
    (a) providing a water soluble branched molecule comprising polyethyleneimine (PEI) with a molecular weight in excess of 1500 Da, the molecule comprising a plurality of branches including a plurality of tertiary amine moieties, a plurality of primary amine moieties, and optionally one or more secondary amine moieties;
    (b) reacting the branched molecule with a cross-linking agent in an inverse suspension of toluene and water stabilized by a surfactant to produce a cross-linked resin matrix in the form of a spherical microparticle comprising a plurality of primary, secondary, and/or tertiary amine moieties;
    (c) quaternizing the plurality of primary, secondary, and/or tertiary amine moieties by reacting a haloalkane reactant with the amine moieties to provide quaternary substitution of the amine moieties with alkyl moieties; and
    (d) during and/or after step (b), removing water from the microparticle so that the water content of the microparticle is less than about 50% water by weight;
    wherein the perchlorate-selective microparticle is selective for perchlorate and comprises a plurality of branched macromolecular structures (A) and a plurality of cross-linking moieties, wherein the plurality of A is cross-linked through the plurality of cross-linking moieties, and wherein each A comprises a plurality of branches and a plurality of terminal functional groups;
    wherein each of the plurality of branches comprises an N,N,N-substituted (quaternary) n-aminoalkyl moiety comprising three substituent moieties, and wherein each of the plurality of branches optionally comprises one or more N,N-substituted (tertiary) n-aminoalkyl moieties comprising two substituent moieties;
    wherein each of the substituent moieties comprises one of the following:
    (a) another of said plurality of branches;
    (b) one of the plurality of terminal functional groups; or
    (c) one of the cross-linking moieties attached at a first cross-linking end, wherein the cross-linking moiety further comprises a second cross-linking end, by which the moiety is also one of the substituent moieties of one of the plurality of branches at a different location within the microparticle;

wherein the cross-linking agent comprises a combination of epichlorohydrin (—CH$_2$—CHOH—CH$_2$—) and 1-bromo-3-chloropropane (—CH$_2$—CH$_2$—CH$_2$—); and wherein the surfactant comprises sodium dodecyl benzyl sulfonate (SDBS).

2. The microparticle of claim 1, wherein each of the plurality of terminal functional groups are alkyl moieties having no less than two and no more than six carbon atoms.

3. The microparticle of claim 1, wherein the strong-base exchange capacity (SBEC) of the microparticle is greater than about 1.5 eq/L.

4. The microparticle of claim 3, wherein the strong-base exchange capacity (SBEC) of the microparticle is greater than about 2.0 eq/L.

5. The microparticle of claim 4, wherein the strong-base exchange capacity (SBEC) of the microparticle is greater than about 2.5 eq/L.

6. The microparticle of claim 1, wherein the water content of the microparticle is less than about 40% and greater than about 25% by weight.

7. The microparticle of claim 2, wherein the haloalkane reactant is derived from iodoethane, bromobutane, or 1-bromohexane.

8. The microparticle of claim 1, wherein the microparticle selectively binds ClO$_4^-$ in an aqueous media.

9. The microparticle of claim 1, wherein the microparticle is used for water treatment.

10. A perchlorate-selective microparticle prepared by a method comprising:
  (a) providing a water soluble branched molecule comprising polyethyleneimine (PEI) with a molecular weight of 1800, 10000 or 25000 Da, the molecule comprising a plurality of branches including a plurality of tertiary amine moieties, a plurality of primary amine moieties, and optionally one or more secondary amine moieties;
  (b) reacting the branched molecule with a cross-linking agent comprising a combination of epichlorohydrin (—CH$_2$—CHOH—CH$_2$—) and 1-bromo-3-chloropropane (—CH$_2$—CH$_2$—CH$_2$—) in an inverse suspension of toluene and water stabilized by a surfactant comprising sodium dodecyl benzyl sulfonate (SDBS) to produce a cross-linked resin matrix in the form of a spherical microparticle comprising a plurality of primary, secondary, and/or tertiary amine moieties;
  (c) quaternizing the plurality of primary, secondary, and/or tertiary amine moieties by reacting a haloalkane reactant with the amine moieties to provide quaternary substitution of the amine moieties with alkyl moieties; and
  (d) during and/or after step (b), removing water from the microparticle so that the water content of the microparticle is less than about 50% water by weight;

wherein the perchlorate-selective microparticle comprises a plurality of branched macromolecular structures (A) and a plurality of cross-linking moieties, wherein the plurality of A is cross-linked through the plurality of cross-linking moieties, and wherein each A comprises a plurality of branches and a plurality of terminal functional groups;

wherein each of the plurality of branches comprises an N,N,N-substituted (quaternary) n-aminoalkyl moiety comprising three substituent moieties, and wherein each of the plurality of branches optionally comprises one or more N,N-substituted (tertiary) n-aminoalkyl moieties comprising two substituent moieties;

wherein each of the substituent moieties comprises one of the following:

(a) another of said plurality of branches;

(b) one of the plurality of terminal functional groups; or (c) one of the cross-linking moieties attached at a first cross-linking end, wherein the cross-linking moiety further comprises a second cross-linking end, by which the moiety is also one of the substituent moieties of one of the plurality of branches at a different location within the microparticle.

\* \* \* \* \*